US012605631B2

(12) United States Patent
Asai

(10) Patent No.: US 12,605,631 B2
(45) Date of Patent: Apr. 21, 2026

(54) SYSTEMS AND METHODS OF SYNCHRONIZING GAME STATES IN A MULTIPLE PLAYER GAME BY DYNAMICALLY CONTROLLING MOVING OBJECT SPEED

(71) Applicant: Nintendo Co., Ltd., Kyoto (JP)

(72) Inventor: Wataru Asai, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 747 days.

(21) Appl. No.: 17/941,908

(22) Filed: Sep. 9, 2022

(65) Prior Publication Data

US 2023/0191253 A1 Jun. 22, 2023

(30) Foreign Application Priority Data

Dec. 21, 2021 (JP) ................................. 2021-207214

(51) Int. Cl.
| | |
|---|---|
| *A63F 13/56* | (2014.01) |
| *A63F 13/30* | (2014.01) |
| *A63F 13/573* | (2014.01) |
| *A63F 13/847* | (2014.01) |
| *A63F 13/812* | (2014.01) |

(52) U.S. Cl.
CPC .............. *A63F 13/56* (2014.09); *A63F 13/30* (2014.09); *A63F 13/573* (2014.09); *A63F 13/847* (2014.09); *A63F 13/812* (2014.09); *A63F 2300/646* (2013.01); *A63F 2300/6607* (2013.01)

(58) Field of Classification Search
CPC .. A63F 13/56; A63F 13/573; A63F 2300/646;
A63F 2300/6607; A63F 13/358; A63F
13/44; A63F 13/31; A63F 13/35; A63F
13/30; A63F 13/428; A63F 13/847
See application file for complete search history.

(56) References Cited

U.S. PATENT DOCUMENTS

| | | | |
|---|---|---|---|
| 8,100,771 B2 * | 1/2012 | Maeda .................. | A63F 13/803 463/43 |
| 2006/0154713 A1 * | 7/2006 | Sunazuka ............... | A63F 13/87 463/6 |
| 2007/0220363 A1 * | 9/2007 | Aggarwal ........... | G07F 17/3239 714/45 |
| 2010/0099469 A1 * | 4/2010 | Tsurumoto .......... | A63F 13/5372 463/43 |
| 2015/0109185 A1 | 4/2015 | Shimamura et al. | |
| 2018/0341335 A1 | 11/2018 | Hinoshita et al. | |
| 2018/0341339 A1 | 11/2018 | Ogura et al. | |
| 2019/0091569 A1 * | 3/2019 | Wu ......................... | A63F 13/42 |
| 2021/0146241 A1 * | 5/2021 | Bleasdale-Shepherd .................... G06N 20/00 | |

FOREIGN PATENT DOCUMENTS

| | | |
|---|---|---|
| JP | 2015-082180 | 4/2015 |
| JP | 2017-113233 | 6/2017 |
| JP | 2018-114185 | 7/2018 |
| JP | 2018-196578 | 12/2018 |
| JP | 2020-146153 | 9/2020 |

* cited by examiner

*Primary Examiner* — Justin L Myhr
(74) *Attorney, Agent, or Firm* — Nixon & Vanderhye, PC

(57) ABSTRACT

Provided is an information processing system in which a moving object (ball) is moved at a first speed in first to third virtual spaces of first to third apparatuses. In the second virtual space of the second apparatus, the moving speed of the moving object is changed from the first speed to a second speed lower than the first speed.

20 Claims, 24 Drawing Sheets

FIG.2

| | (OPPONENT'S BALL) | FIRST TOUCH | SECOND TOUCH | THIRD TOUCH | (OPPONENT'S BALL) | FIRST TOUCH | SECOND TOUCH | THIRD TOUCH |
|---|---|---|---|---|---|---|---|---|
| 1P | SERVER | RECEIVER | | ATTACKER | BLOCKER | | SETTER | |
| 2P | | BLOCKER | SETTER | | | RECEIVER | | ATTACKER |

(1) FIRST APPARATUS (OPPONENT'S ATTACKER)

(2) FOURTH APPARATUS (OPPONENT'S SETTER)

(3) SECOND APPARATUS (ALLY'S BLOCKER)

(4) THIRD APPARATUS (ALLY'S RECEIVER)

(1) FIRST APPARATUS (OPPONENT'S ATTACKER)

(2) FOURTH APPARATUS (OPPONENT'S SETTER)

(3) SECOND APPARATUS (ALLY'S BLOCKER)

(4) THIRD APPARATUS (ALLY'S RECEIVER)

(1)FIRST APPARATUS (OPPONENT'S ATTACKER)

(2)FOURTH APPARATUS (OPPONENT'S SETTER)

(3)SECOND APPARATUS (ALLY'S BLOCKER)

(4)THIRD APPARATUS (ALLY'S RECEIVER)

(1)FIRST APPARATUS (OPPONENT'S ATTACKER)

(2)FOURTH APPARATUS (OPPONENT'S SETTER)

(3)SECOND APPARATUS (ALLY'S BLOCKER)

(4)THIRD APPARATUS (ALLY'S RECEIVER)

(1) FIRST APPARATUS (OPPONENT'S ATTACKER)

(2) FOURTH APPARATUS (OPPONENT'S SETTER)

(3) SECOND APPARATUS (ALLY'S BLOCKER)

(4) THIRD APPARATUS (ALLY'S RECEIVER)

(1) FIRST APPARATUS (OPPONENT'S ATTACKER)

(2) FOURTH APPARATUS (OPPONENT'S SETTER)

(3) SECOND APPARATUS (ALLY'S BLOCKER)

(4) THIRD APPARATUS (ALLY'S RECEIVER)

(1)FIRST APPARATUS (OPPONENT'S ATTACKER)

(2)FOURTH APPARATUS (OPPONENT'S SETTER)

(3)SECOND APPARATUS (ALLY'S BLOCKER)

(4)THIRD APPARATUS (ALLY'S RECEIVER)

(1) FIRST APPARATUS (OPPONENT'S ATTACKER)

(2) FOURTH APPARATUS (OPPONENT'S SETTER)

(3) SECOND APPARATUS (ALLY'S BLOCKER)

(4) THIRD APPARATUS (ALLY'S RECEIVER)

(1) FIRST APPARATUS (OPPONENT'S ATTACKER)

(2) FOURTH APPARATUS (OPPONENT'S SETTER)

(3) SECOND APPARATUS (ALLY'S BLOCKER)

(4) THIRD APPARATUS (ALLY'S RECEIVER)

22

GAME PROGRAM    101

OWN PLAYER CHARACTER DATA    102

OTHER PLAYER CHARACTER DATA    103

BALL DATA    104

IMAGE DATA    105

OPERATION DATA    106

SYSTEMS AND METHODS OF SYNCHRONIZING GAME STATES IN A MULTIPLE PLAYER GAME BY DYNAMICALLY CONTROLLING MOVING OBJECT SPEED

CROSS REFERENCE TO RELATED APPLICATION

This application claims priority Japanese Patent Application No. 2021-207214 filed on Dec. 21, 2021, the entire contents of which are incorporated herein by reference.

FIELD

The present disclosure relates to processing of an on-line competition game in which the game states of at least three information processing apparatuses are synchronized.

BACKGROUND AND SUMMARY

Conventionally, a game apparatus that performs a countermeasure against communication delay in an on-line competition game in which the game states of at least two information processing apparatuses are synchronized, has been known.

In the above game apparatus, when synchronization of game event occurrence states is attempted between at least three information processing apparatuses (game apparatuses), a time lag occurs before a result of processing in a certain information processing apparatus is synchronized in another information processing apparatus. This time lag causes a difference in game event occurrence states of the information processing apparatuses, resulting in an unnatural display.

Therefore, an object of the present disclosure is to provide an information processing system, a non-transitory computer-readable storage medium having stored therein a program, an information processing apparatus, and an information processing method capable of realizing a natural display that does not cause a sense of discomfort in each information processing apparatus when synchronization of game event occurrence states is attempted between at least three information processing apparatuses.

In order to attain the above object, for example, the following configuration examples are exemplified.

An example of configuration 1 is an information processing system for providing an on-line competition game in which game states are synchronized between at least three information processing apparatuses. A first information processing apparatus includes a first processor and a memory connected thereto, and the first processor provides a first virtual space. A second information processing apparatus includes a second processor and a memory connected thereto, and the second processor provides a second virtual space. A third information processing apparatus includes a third processor and a memory connected thereto, and the third processor provides a third virtual space. The first virtual space, the second virtual space, and the third virtual space correspond to each other. The first processor performs a first game event regarding a moving object in the first virtual space, transmits first data regarding execution of the first game event to the second information processing apparatus and the third information processing apparatus, and controls movement of the moving object such that the moving object moves in the first virtual space, on the basis of the first game event. The second processor controls movement of the moving object such that the moving object moves in the second virtual space, on the basis of the first data received from the first information processing apparatus. The third processor controls movement of the moving object such that the moving object moves in the third virtual space, on the basis of the first data received from the first information processing apparatus. The second processors perform a second game event for changing a moving direction of the moving object when a first condition regarding the moving object, which is moving in the second virtual space on the basis of the first data, has been satisfied. When the second game event is performed, the second processor transmits second data regarding the second game event to the first information processing apparatus and the third information processing apparatus. When the first condition has been satisfied, the first processor controls movement of the moving object in the first virtual space, on the basis of the second data received from the second information processing apparatus. When the first condition has been satisfied, the third processor controls movement of the moving object in the third virtual space on the basis of the second data obtained from the second information processing apparatus. When the second game event has not been performed and a second condition regarding the moving object, which is moving in the third virtual space on the basis of the first data, has been satisfied, the third processor performs a third game event for changing the moving direction of the moving object. The first processor controls movement of the moving object such that the moving object moves at a first speed during a period after the first game event. The second processor controls movement of the moving object such that the moving object moves at the first speed during a first period after reception of the first data. The third processor controls movement of the moving object such that the moving object moves at the first speed during a period after reception of the first data. The second processor controls movement of the moving object such that the moving object moves at a second speed lower than the first speed during a second period after the first period.

According to the above configuration example, in the second information processing apparatus, a natural display that does not cause a sense of discomfort can be achieved.

In an example of configuration 2, the second period may be a period after the moving object has passed by a predetermined position in the second virtual space, in the example of the above configuration 1.

In an example of configuration 3, the first processor may control movement of the moving object when a first waiting time has passed after the first game event, in the example of the above configuration 1.

According to the above configuration example, in the first information processing apparatus, a natural display that does not cause a sense of discomfort can be achieved.

In an example of configuration 4, the third processor may control movement of the moving object when a second waiting time has passed after reception of the first data, in the example of the above configuration 3.

According to the above configuration example, in the third information processing apparatus, a natural display that does not cause a sense of discomfort can be achieved.

In an example of configuration 5, the second waiting time may be shorter than the first waiting time, in the example of the above configuration 4.

According to the above configuration example, in the first information processing apparatus, a natural display that does not cause a sense of discomfort can be achieved.

In an example of configuration 6, the first waiting time may be a time obtained by doubling a time regarding data transmission/reception between the first apparatus and the third apparatus, in the example of the above configuration 3.

In an example of configuration 7, the second waiting time may be a time regarding data transmission from the first apparatus to the third apparatus, or a time obtained by doubling the time regarding data transmission from the third apparatus to the first apparatus, in the example of the above configuration 4.

According to the above configuration examples, in the first information processing apparatus, a natural display that does not cause a sense of discomfort can be achieved.

In an example of configuration 8, the first processor, the second processor, and the third processor may each move the moving object at a normal speed during a normal period before the first game event, in the example of the above configuration 1.

According to the above configuration example, during the normal period before the first game event, the moving object is moved at the normal speed in each virtual space to perform a natural display.

In an example of configuration 9, the normal speed may be equal to the first speed, in the example of the above configuration 8.

In an example of configuration 10, in the on-line competition game, an opponent character linked with the first information processing apparatus may be disposed in each of first areas in the first virtual space, the second virtual space, and the third virtual space, and a first ally character linked with the second information processing apparatus and a second ally character linked with the third information processing apparatus may be disposed in each of second areas in the first virtual space, the second virtual space, and the third virtual space, in the example of the above configuration 1. The first game event may include at least a control in which the opponent character moves the moving object from the first area to the second area. The second game event may include at least a control in which the first ally character, based on the second data, causes the moving object being moved according to the first game event to move toward the first area. The third game event may include at least a control in which the moving object being moved according to the first game event is moved toward the first ally character.

According to the above configuration example, in the on-line competition type volleyball game, a natural display that does not cause a sense of discomfort can be achieved in each information processing apparatus.

In an example of configuration 11, in accordance with a progress of the on-line competition game, each of the first game event, the second game event, and the third game event may be performed while changing an apparatus to perform the event among at least the first information processing apparatus, the second information processing apparatus, and the third information processing apparatus, in the example of the above configuration 1.

According to the above configuration example, the roles of the users in the game can be diversified, thereby improving the entertainment characteristics of the game.

According to the exemplary embodiment, in the case where synchronization of game event occurrence states is attempted between at least three information processing apparatuses, a natural display that does not cause a sense of discomfort can be achieved in each information processing apparatus.

These and other objects, features, aspects and advantages of the present invention will become more apparent from the following detailed description when taken in conjunction with the accompanying drawings.

BRIEF DESCRIPTION OF THE DRAWINGS

FIG. 2 illustrates roles in a game of the present disclosure;

DETAILED DESCRIPTION OF NON-LIMITING EXAMPLE EMBODIMENTS

Hereinafter, an exemplary embodiment will be described. [Hardware Configuration of Information Processing Apparatus]

First, an information processing apparatus for executing information processing according to the exemplary embodiment will be described. The information processing apparatus is, for example, a smartphone, a stationary or handheld game apparatus, a tablet terminal, a mobile phone, a personal computer, a wearable terminal, or the like. In addition, the information processing according to the exemplary embodiment can also be applied to a game system that includes the above game apparatus or the like and a predetermined server. In the exemplary embodiment, a stationary game apparatus (hereinafter, sometimes referred to as a game apparatus) will be described as an example of the information processing apparatus.

Figure 1:
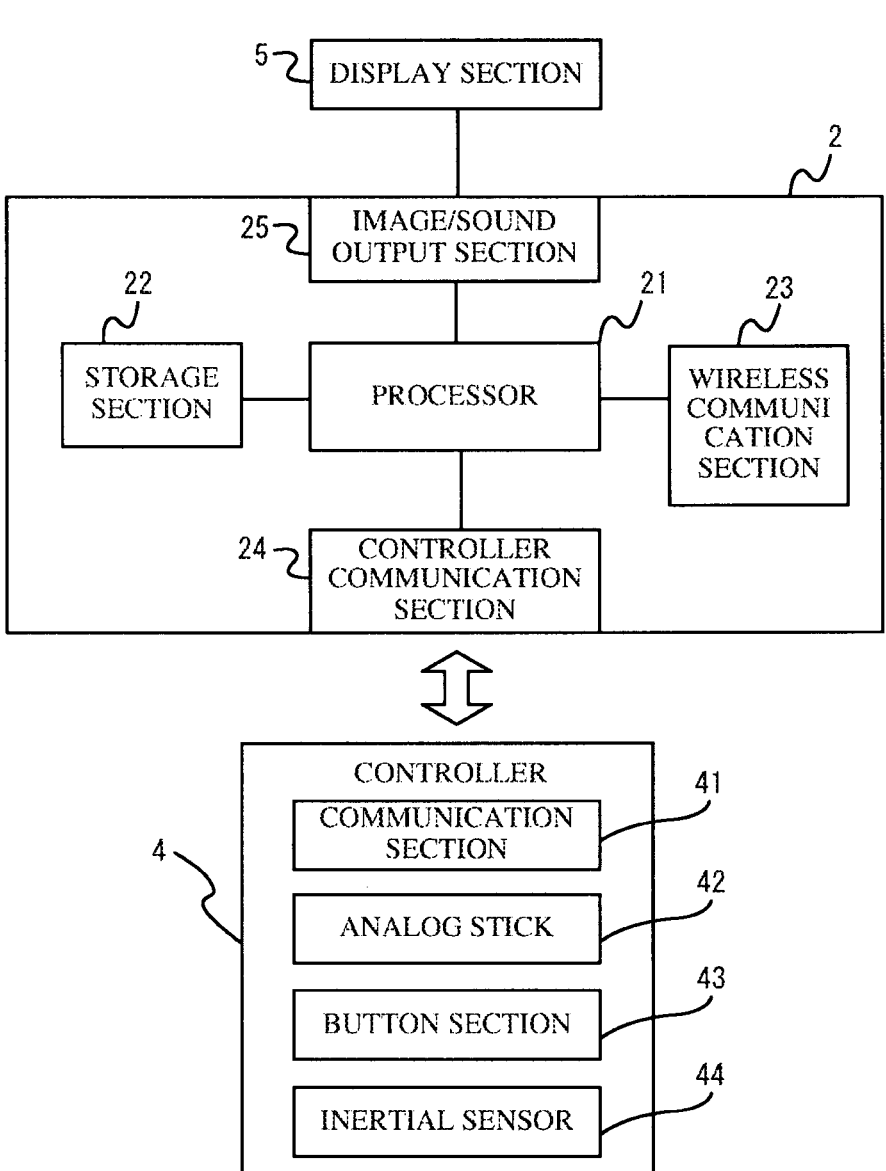
FIG. 1 is a block diagram showing a non-limiting example of an internal configuration and the like of a game apparatus 2.

FIG. 1 is a block diagram showing a non-limiting example of the internal configuration and the like of a game apparatus 2 according to the exemplary embodiment. The game apparatus 2 includes a processor 21. The processor 21 is an information processing section for executing various types of information processing to be executed by the game apparatus 2. For example, the processor 21 may be composed only of a CPU (Central Processing Unit), or may be composed of a SoC (System-on-a-chip) having a plurality of functions such as a CPU function and a GPU (Graphics Processing Unit) function. The processor 21 performs the various types of information processing by executing an information processing program (e.g., a game program) stored in a storage section 22. The storage section 22 may be, for example, an internal storage medium such as a flash memory and a dynamic random access memory (DRAM), or may be configured to utilize an external storage medium mounted to a slot that is not shown, or the like.

The game apparatus 2 also includes a wireless communication section 23 for the game apparatus 2 to perform wireless communication with another game apparatus 2 and a predetermined server device. As the wireless communication, for example, Internet communication or short-range wireless communication is used.

The game apparatus 2 also includes a controller communication section 24 for the game apparatus 2 to perform wired or wireless communication with a controller 4.

Moreover, a display section 5 (e.g., a television, or the like) is connected to the game apparatus 2 via an image/sound output section 25. The processor 21 outputs an image and sound generated (e.g., by executing the above information processing) to the display section 5 via the image/sound output section 25.

Next, the controller 4 will be described. Although not shown in the figure, the controller 4 of the exemplary embodiment includes a housing having a vertically long shape, and can be held in the orientation in which the controller 4 is vertically long. The housing has such a shape and a size that when held in the orientation in which the housing is vertically long, the housing can be held with one hand.

The controller 4 includes at least one analog stick 42 being an example of a direction input device. The analog stick 42 can be used as a direction input section capable of inputting a direction. By tilting the analog stick 42, the user can input a direction corresponding to the direction of the tilt (and an input having a magnitude corresponding to the angle of the tilt). The controller 4 includes a button section 43 including various operation buttons. For example, the controller 4 may include a plurality of operation buttons on the main surface of the housing.

The controller 4 includes an inertial sensor 44. Specifically, the controller 4 includes an acceleration sensor and an angular velocity sensor, as the inertial sensor 44. In the exemplary embodiment, the acceleration sensor detects the magnitudes of accelerations along predetermined three-axis directions. The angular velocity sensor detects angular velocities around the predetermined three axes.

The controller 4 also includes a communication section 41 for performing wired or wireless communication with the controller communication section 24. The content of a direction input to the analog stick 42, information indicating the press state of the button section 43, and various detection results by the inertial sensor 44 are repeatedly outputted to the communication section 41 at appropriate timings, to be transmitted to the game apparatus 2.

[Game Assumed in the Exemplary Embodiment]

Next, the outline of game processing (an example of information processing) executed by the game apparatus 2 according to the exemplary embodiment will be described. First, the game assumed in the exemplary embodiment is a game the concept of which is volleyball. Specifically, in this game, a plurality of athlete character objects (hereinafter, sometimes referred to as "characters") being virtual human-type objects are divided into opponent team characters and ally team characters. In a volleyball court prepared in a virtual space, the characters in each team are arranged in an area (an ally court or an opponent court) associated with the team. Each character is caused to perform a predetermined action based on an operation performed by the user, whereby the character is brought into contact with a ball object (hereinafter, sometimes referred to as "ball") that is an example of a moving object. As a result, the ball is moved. In this game, the ball is returned to the opponent court after three ball touches (a ball touch due to a block is excluded) in the ally court while keeping the ball in the air, thereby continuing a rally. When the ball lands in the area of the opponent court, one point is given as a score. In the exemplary embodiment, a team that has earned five points first in one game match is a winner.

In this game, the number of characters in each team is two. That is, this game is played with four characters in a 2 vs 2 team match (i.e., volleyball played by two people in each team). This game can be played by a plurality of users through a network such as the Internet. In the exemplary embodiment, it is assumed that one user is in charge of one character and operates the character. Since this game is a 2 vs 2 online multiplayer game as described above, four users at maximum can participate the game. In the exemplary embodiment, one game apparatus is assigned to one user, so that four game apparatuses 2 in total are connected through the network.

[Game Progress]

This game is played while the roles of the two characters in each team are successively changed. The roles are as follows. That is, the concept of this game is volleyball, and the roles correspond to roles (positions) in volleyball. Specifically, the roles include a "server", a "receiver", a "setter", an "attacker (spiker)", and a "blocker". The aforementioned predetermined action is an action corresponding to each role. For example, a character the role of which is the setter performs, as the predetermined action, an action of tossing the ball toward the attacker (a motion of tossing the ball with both hands raised above head). For example, a character the role of which is the attacker performs, as the predetermined action, an action of performing an attack on (action of spiking) the ball tossed (by the setter), toward the opponent court (a motion of jumping and swinging an arm to hit the ball). For example, a character the role of which is the blocker performs, as the predetermined action, an action of blocking an attack of the opponent team (a motion of jumping with both hands raised above head). In this game, as for the aforementioned five roles, the roles of the two characters in each team are changed in a predetermined order while the game is being played.

An example of the order of the roles is shown in FIG. 2. In addition, an example of the game progress is described with reference to FIG. 2. Here, it is assumed that, of the characters in the ally team, the first (1P side) character is operated by the user while the second (2P side) character is operated by another user. The ally team has the right to serve, and the first character takes the role of the server. When a match has started, first, the first character hits a serve according to a predetermined operation performed by the user. The next role of the first character is the receiver. Through the serve, the ball is delivered to the opponent court, and after three ball touches, the ball is returned to the ally court. At this time, the role of the second character is the blocker. That is, the second character takes the role of blocking an attack of the opponent team (as described above, the block is not counted as a ball touch). The next role of the second character is the setter.

Next, when the ball is returned to the ally court (because the blocker could not block the opponent's attack), the first (1P side) character as the receiver performs an action of touching the ball for the first time. That is, the first character bumps the ball according to a predetermined operation performed by the user. The next role of the first character is the attacker.

Subsequently, the second (2P side) character as the setter performs an action of touching the ball for the second time. That is, the second character performs an action of tossing the ball (toward the attacker) according to a predetermined operation performed by the other user. The next role of the second character is the receiver.

When the ball has been tossed, the first character as the attacker performs an action of touching the ball for the third time. That is, the first character performs an action of performing an attack on the ball according to a predetermined operation performed by the user. After the attack, the next role of the first character is the blocker. That is, the role of the blocker, which has been taken by the second character, is now taken by the first character.

Thereafter, the game is progressed while the aforementioned roles assigned to the first character and the second character are replaced with each other. That is, the role of the first character is changed in the order of blocker→setter, and the role of the second character is changed in the order of receiver→attacker.

[Outline of Game Processing of Exemplary Embodiment]

Next, an operation concept of game processing executed in the game apparatus 2 according to the exemplary embodiment will be described. As described above, this game is a volleyball game to be played in a 2 vs 2 team match. Four game apparatuses 2 ("first apparatus", "second apparatus", "third apparatus", and "fourth apparatus") are connected to each other via the Internet to progress the game.

In the case where the game apparatuses 2 connected to each other via the Internet progress the game while synchronizing the game states therebetween, since communication between the game apparatuses 2 takes time (i.e., a communication delay occurs), the content of display on a game screen may become unnatural and cause discomfort for the user. In the exemplary embodiment, as described below, a countermeasure against such communication delay is performed in the volleyball game, whereby the content of display on the game screen becomes natural and does not cause a sense of discomfort.

[First Countermeasure Against Communication Delay]

Figure 3:
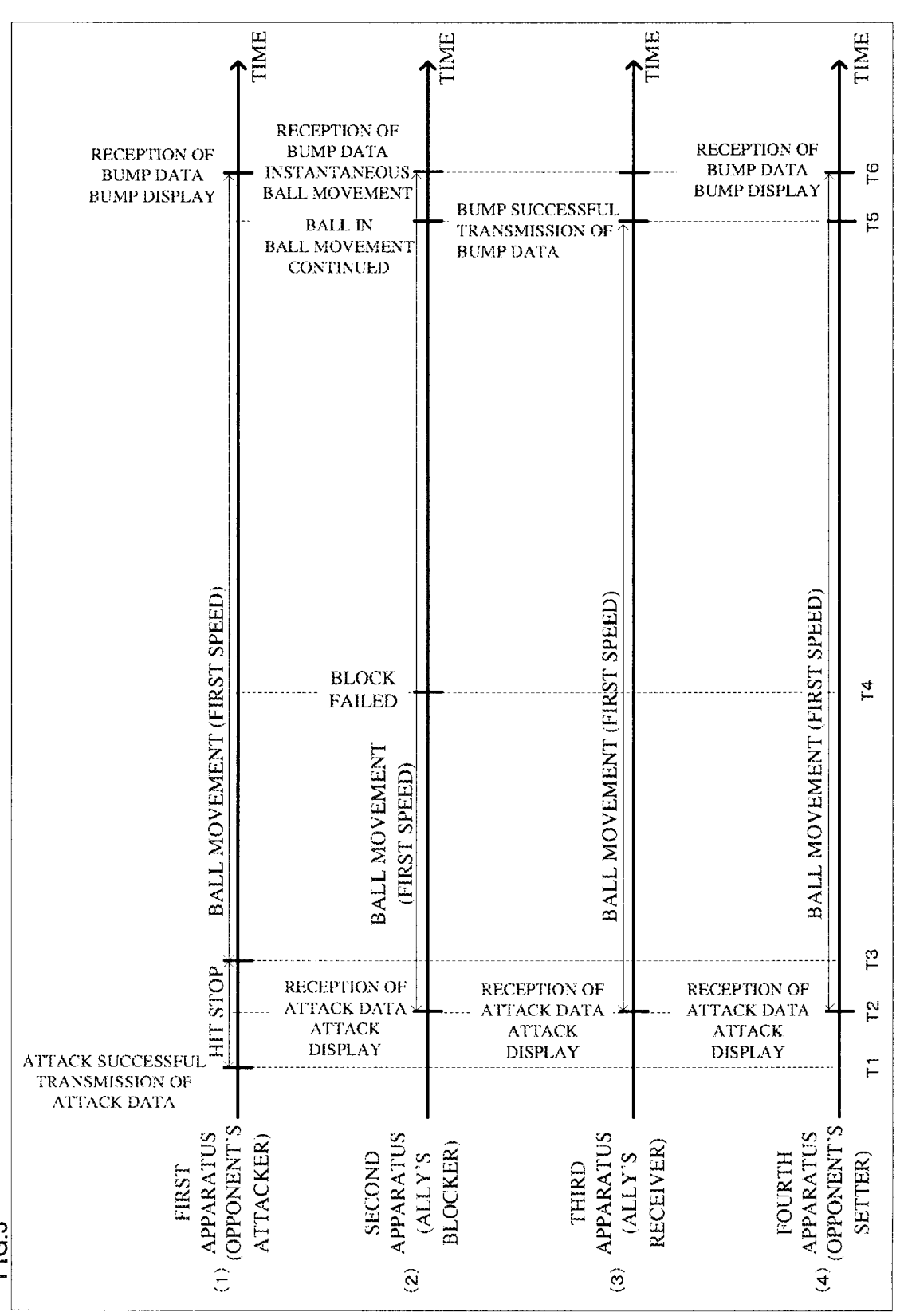
FIG. 3 is a time chart illustrating a first countermeasure against communication delay.
Figure 4:
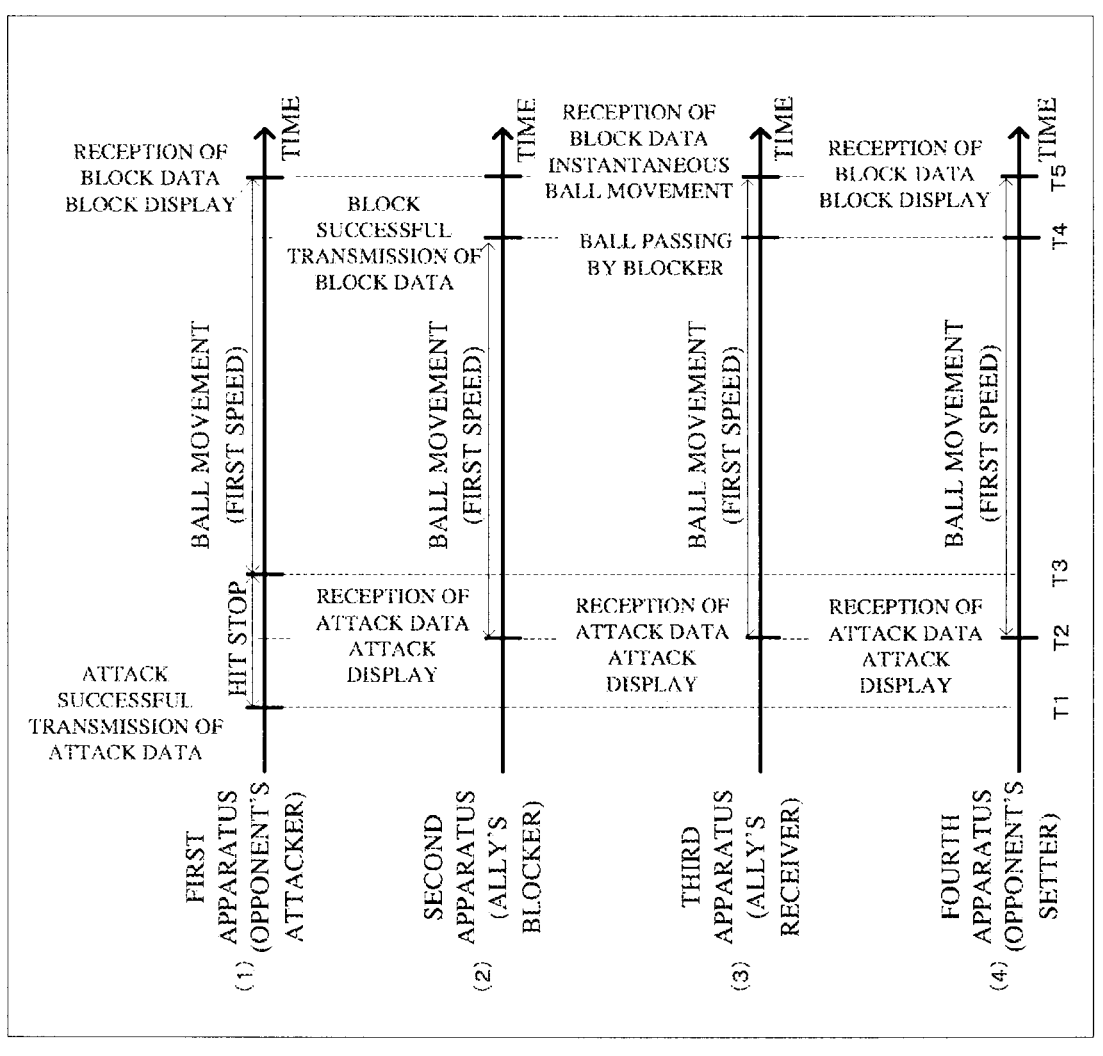
FIG. 4 is a time chart illustrating the first countermeasure against communication delay.

FIG. 3 and FIG. 4 are time charts illustrating a first countermeasure against communication delay, according to the exemplary embodiment. FIG. 5 to FIG. 11 illustrate game screen displays (screen displays of the first to fourth apparatuses) at timings in the time charts shown in FIG. 3 and FIG. 4. A case where an opponent's attacker hits an attack is described below with reference to FIG. 3 to FIG. 11. In FIG. 3 and FIG. 4, (1) is the time chart of the first apparatus taking the role of an opponent's attacker, (2) is the time chart of the second apparatus taking the role of an ally's blocker, (3) is the time chart of the third apparatus taking the role of an ally's receiver, and (4) is the time chart of the fourth apparatus taking the role of an opponent's setter. As shown in FIG. 3 and FIG. 4, the time charts of (1) to (4) are aligned in time sequence.

First, a case where the ally's blocker (second apparatus) fails in a block and the ally's receiver (third apparatus) succeeds in a bump is described with reference to FIG. 3, and FIG. 5 to FIG. 9. As described below, in this case, the ball behaves as if moving through a space warp (moving instantaneously) in the second apparatus.

At T1 in FIG. 3, when a predetermined operation (an appropriate attack operation at an appropriate timing) has been performed to the first apparatus (opponent's attacker), the opponent's attacker succeeds in an attack, and attack data is transmitted from the first apparatus to the second to fourth apparatuses. The attack data is data indicating a moving speed, a moving direction, etc., of the attack ball which are determined based on the content of the predetermined operation, and the ball moves in the game screens of the first to fourth apparatuses on the basis of the data. The attack data may include coordinates of a destination of the attack ball 67 (e.g., coordinates of a predicted landing point in a case where the direction of the ball 67 is not changed by a block or the like), and the like. Furthermore, the first to fourth apparatuses are provided with virtual spaces (of volleyball courts) corresponding to each other. Each of the first to fourth apparatuses controls movement of the ball 67 in the virtual space. The movement control is performed while taking into account gravity, etc.

Figure 5:
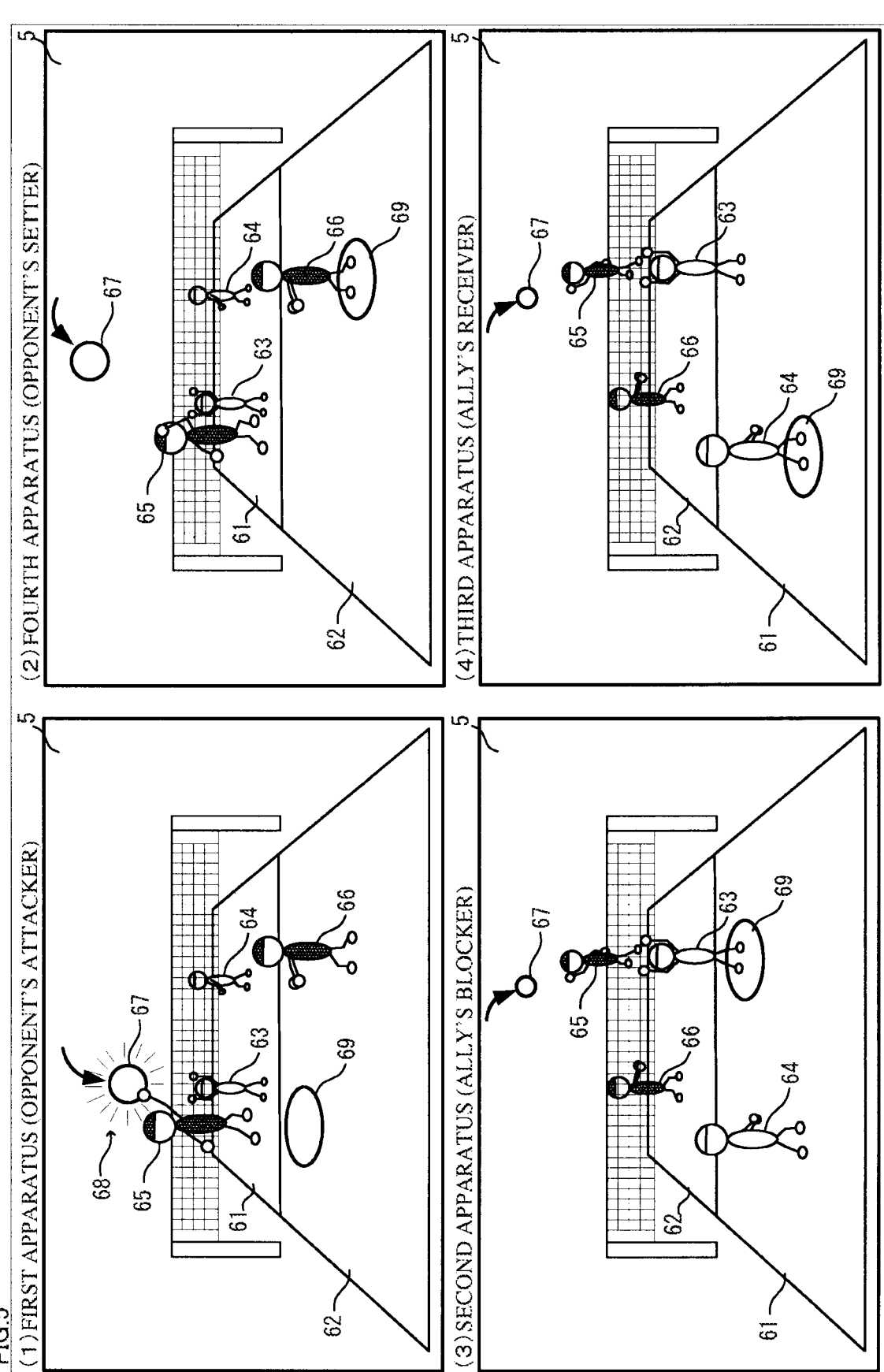
FIG. 5 illustrates a game screen display.

FIG. 5 shows a non-limiting example of the game screens of the first to fourth apparatuses at T1 in FIG. 3. As shown in (1) of FIG. 5, on the game screen of the first apparatus (opponent's attacker), a display in which a character 65 controlled by the first apparatus performs an attack on the ball 67 is performed. In the meantime, a hit stop display is performed, and a light-emitting display 68 indicating that the ball 67 is in the hit stop state is performed. Here, the hit stop is an effect of stopping the time progress in the game screen (virtual space) for a predetermined time (predetermined waiting time), and is performed as a countermeasure against a communication delay with respect to the apparatus of a communication partner. In the first countermeasure against communication delay, the hit stop display is performed during a time period from when data is transmitted from the first apparatus to the other apparatuses (the second to fourth apparatuses) to when data is transmitted from the other apparatuses to the first apparatus (i.e., a reciprocal communication delay time). The hit stop display may not necessarily be performed during the reciprocal communication delay time, and may be performed during a time period twice a one-way communication delay time.

On the game screens of the first to fourth apparatuses shown in FIG. 5 and subsequent figures, an ally-side court is denoted by a reference numeral 61, an opponent-side court is denoted by a reference numeral 62, an ally's blocker operated by the second apparatus is denoted by a reference numeral 63, an ally's receiver operated by the third apparatus is denoted by a reference numeral 64, an opponent's attacker operated by the first apparatus is denoted by a reference numeral 65, an opponent's setter operated by the fourth apparatus is denoted by a reference numeral 66, a ball is denoted by the reference numeral 67, a light-emitting display indicating that the ball 67 is in the hit stop state is denoted by a reference numeral 68, a circular display that is placed near feet of a character and indicates that the character is operable is denoted by a reference numeral 69, and a moving direction the ball 67 is represented by an arrow.

As shown in (2) to (4) of FIG. 5, on the game screens of the second to fourth apparatuses (opponent's setter, ally's blocker, ally's receiver), the character 65 has not yet performed an attack because the apparatuses have not yet received the attack data.

Next, at T2 in FIG. 3, each of the second to fourth apparatuses receives the attack data, and performs a display in which the character 65 performs an attack on the ball 67 and thereby the ball 67 starts to move. Meanwhile, in the first apparatus, display of the hit stop is continued. For convenience of description, at T2, the second to fourth apparatuses receive the attack data at the same timing, and the ball immediately starts to move. In actuality, however, certain time lags may occur depending on the qualities of communication lines used by the second to fourth apparatuses.

Figure 6:
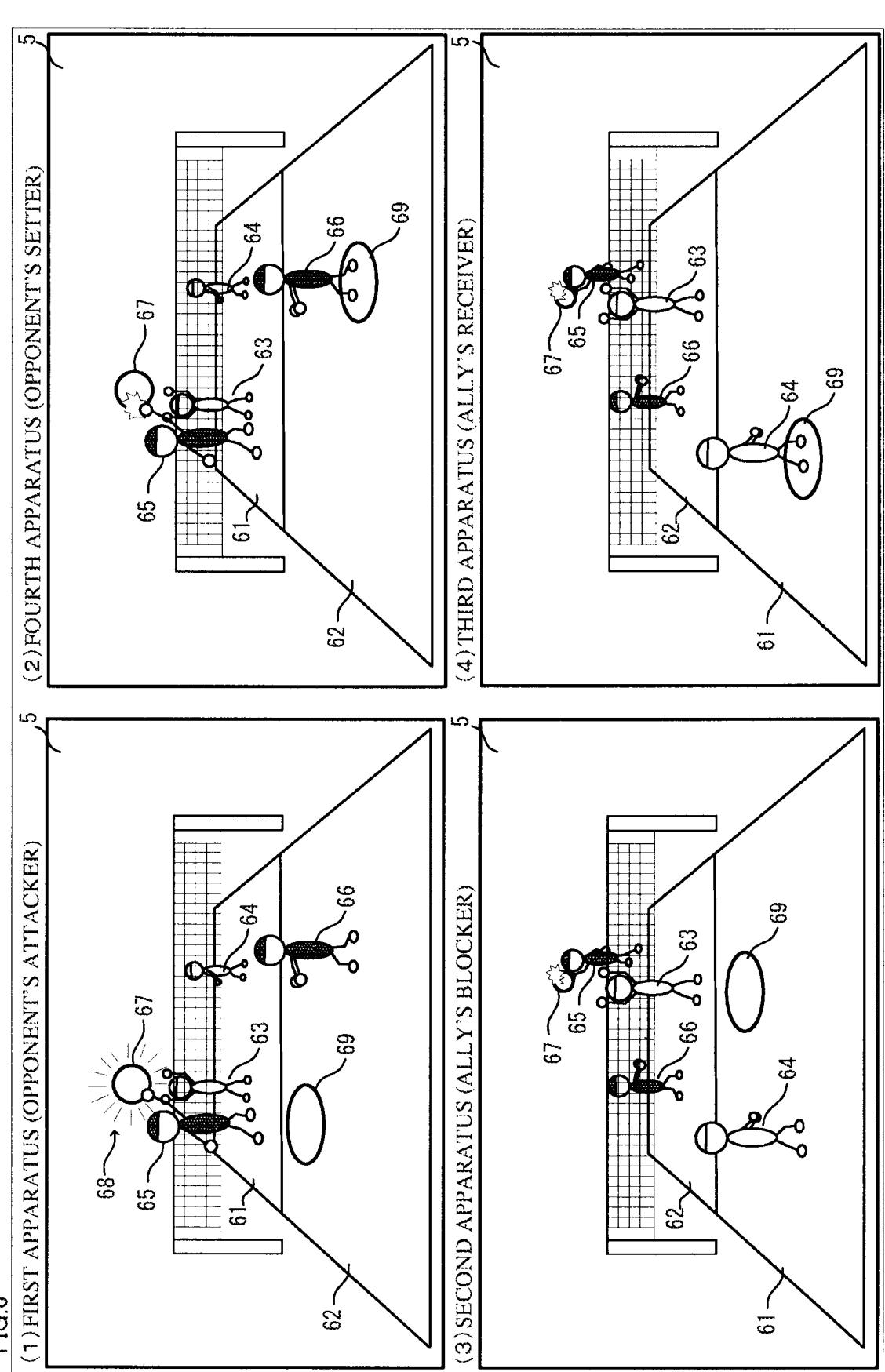
FIG. 6 illustrates a game screen display.

FIG. 6 shows a non-limiting example of the game screens of the first to fourth apparatuses at T2 in FIG. 3. As shown in (1) of FIG. 6, on the game screen of the first apparatus (opponent's attacker) (a virtual space provided by the first apparatus (sometimes referred to as "first virtual space")), the hit stop is continued. Meanwhile, as shown in (2) to (4) of FIG. 6, on the game screens of the second to fourth apparatuses (opponent's setter, ally's blocker, ally's receiver), on the basis of the received attack data, the character 65 performs an attack on the ball 67 and thereby the ball 67 starts to move in a virtual space provided by the second apparatus (sometimes referred to as "second virtual space"), a virtual space provided by the third apparatus (sometimes referred to as "third virtual space"), and a virtual space provided by the fourth apparatus (sometimes referred to as "fourth virtual space"), respectively. As shown in (1) to (4) of FIG. 3, in the virtual spaces provided by the first to fourth apparatuses, the ball 67 moves at the same speed (first speed).

Next, at T3 in FIG. 3, on the game screen (first virtual space) of the first apparatus (attacker), the hit stop is canceled and the ball 67 starts to move (not shown).

Figure 7:
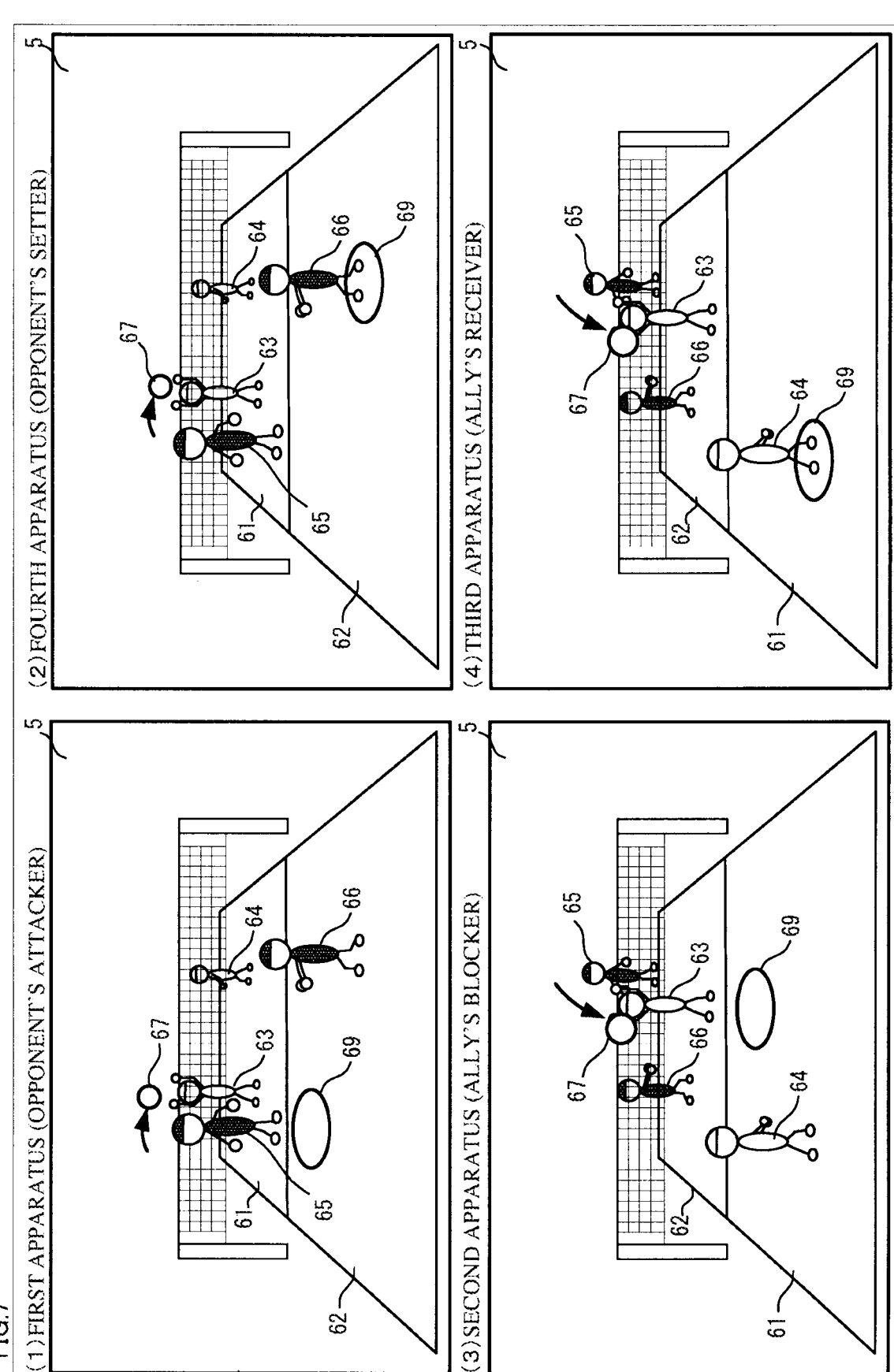
FIG. 7 illustrates a game screen display.

Next, at T4 in FIG. 3, a display in which the second apparatus (ally's blocker) fails in a block and the ball 67 passes by the position of the character 63, is displayed. A block is not successful unless a predetermined operation (an appropriate block operation at an appropriate timing) is performed. FIG. 7 shows a non-limiting example of the game screens of the first to fourth apparatuses at T4 in FIG. 3. As shown in (2) to (4) of FIG. 7, in the virtual spaces of the second to fourth apparatuses, the block fails and the ball 67 passes by the position of the character 63. Meanwhile, as shown in (1) of FIG. 7, in the virtual space of the first apparatus, the ball 67 is moving in front of the character 63 because the start of movement of the ball 67 is delayed (by the one-way communication delay time) due to the hit stop, as compared to the virtual spaces of the second to fourth apparatuses (see FIG. 3).

Next, at T5 in FIG. 3, when a predetermined operation (an appropriate bump operation at an appropriate timing) has been performed to the third apparatus (ally's receiver), the ally's receiver succeeds in a bump, and bump data is transmitted from the third apparatus to the first apparatus, the second apparatus, and the fourth apparatus. The bump data is data indicating a moving speed, a moving direction, etc., of the bumped ball 67 which are determined based on the content of the predetermined operation. The ball 67 moves in the game screens of the first to fourth apparatuses on the basis of the data.

Figure 8:
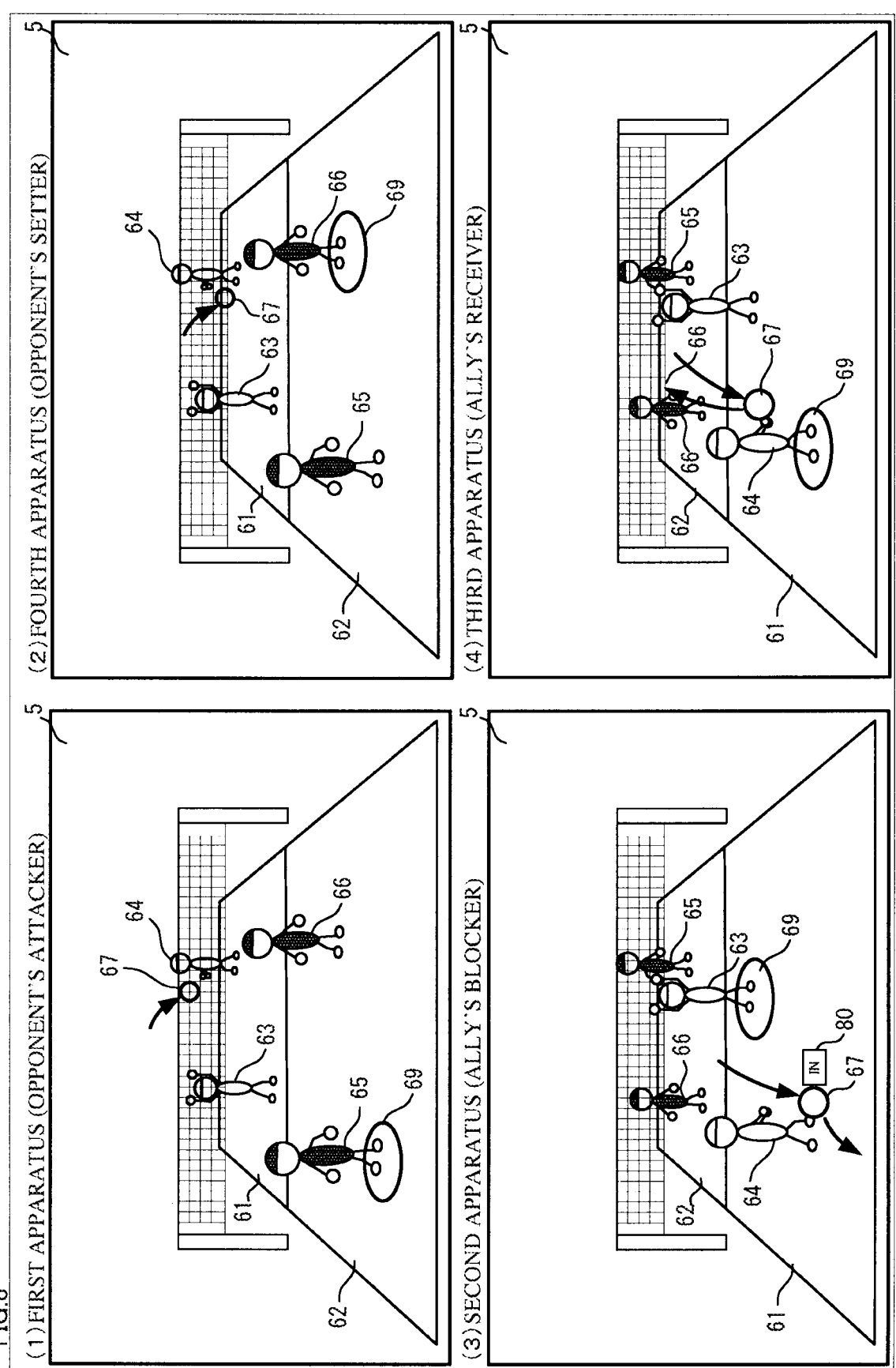
FIG. 8 illustrates a game screen display.

FIG. 8 shows a non-limiting example of the game screens of the first to fourth apparatuses at T5 in FIG. 3. As shown in (4) of FIG. 8, on the game screen of the third apparatus (ally's receiver), a display in which the character 64 operated by the third apparatus bumps the ball 67 is performed. Meanwhile, as shown in (3) of FIG. 8 and (2) of FIG. 3, on the game screen of the second apparatus (ally's blocker), since the second apparatus has not yet received the bump data, the ball 67 lands in the ally-side court 62, and an "IN"

display 80 indicating the same is performed. Likewise, as shown in (2) of FIG. 8, on the game screen of the second apparatus (opponent's setter), since the second apparatus has not yet received the bump data, the ball 67 lands in the ally-side court 62. Here, as shown in (1) of FIG. 8 and (1) of FIG. 3, on the game screen of the first apparatus (opponent's attacker), the ball 67 is moving in front of the character 64 because the start of movement of the ball 67 is delayed (by the one-way communication delay time) due to the hit stop, as compared to the virtual spaces of the second to fourth apparatuses.

Figure 9:
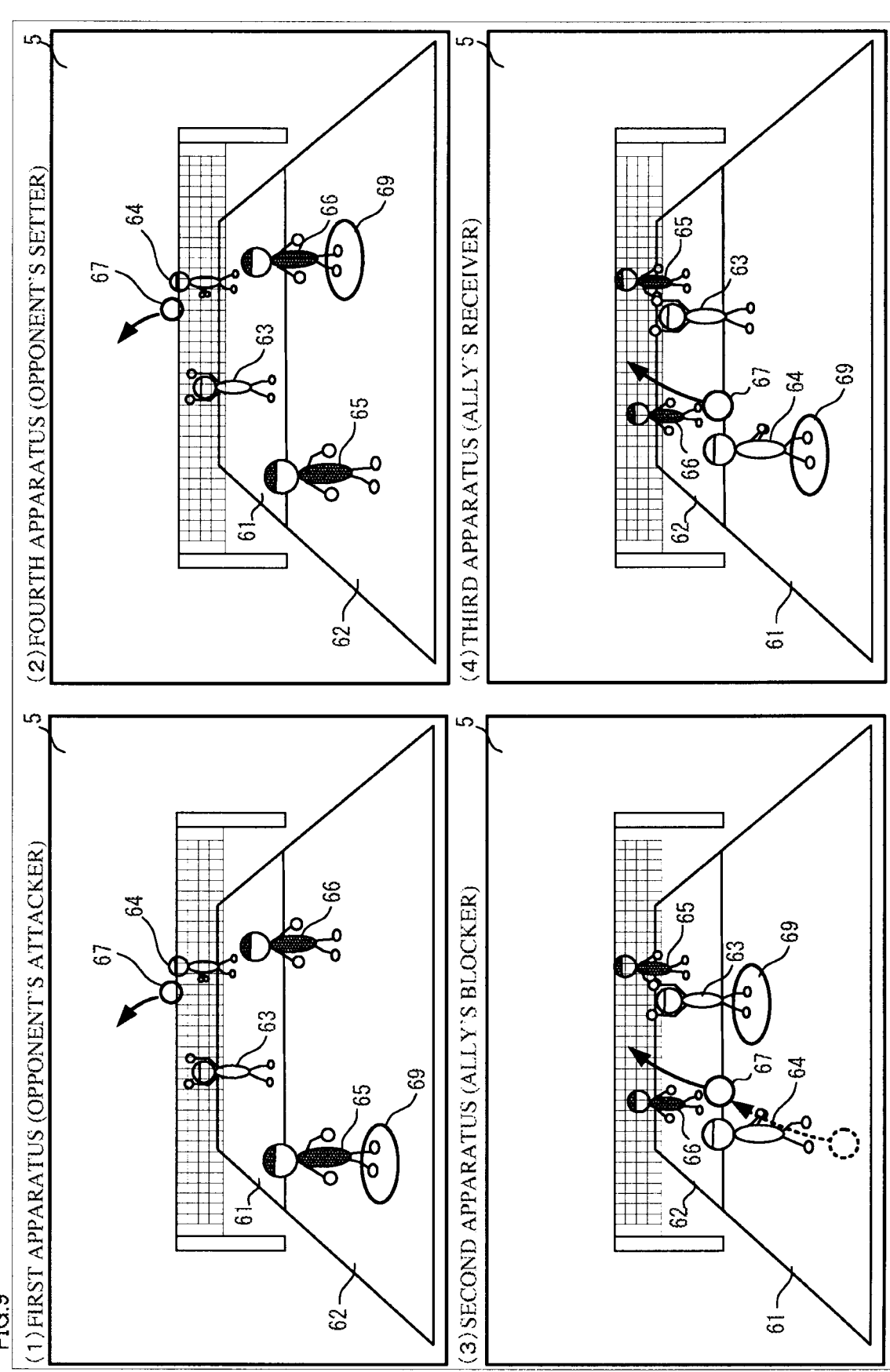
FIG. 9 illustrates a game screen display.

Next, at T6 in FIG. 3, each of the first apparatus, the second apparatus, and the fourth apparatus receives the bump data, and performs a display in which the character 64 bumps the ball 67 and thereby the ball 67 changes its direction and moves. The third apparatus also performs a display in which the ball 67 changes its direction due to a bump and moves. FIG. 9 shows a non-limiting example of the game screens of the first to fourth apparatuses at T6 in FIG. 3. As shown in (1) to (4) of FIG. 9, on the game screens (virtual spaces) of the first to fourth apparatuses (opponent's attacker, opponent's setter, ally's blocker, ally's receiver), the character 64 bumps the ball 67 and thereby the ball 67 changes its direction and moves. Here, as shown in (3) of FIG. 9 and (2) of FIG. 3, on the game screen (virtual space) of the second apparatus (ally's blocker), a control is performed such that the ball 67 having landed in the ally-side court 62 (see (3) of FIG. 8) is moved based on the bump data. At this time, in the virtual space of the second apparatus, since a large difference occurs between the position of the ball 67 before reception of the bump data by the second apparatus and the position of the ball 67 having been moved based on the bump data, a display in which the ball 67 moves through a space warp (moves instantaneously) and the bump succeeds, is performed.

Next, a case where the ally's blocker (second apparatus) has succeeded in a block at T4 in FIG. 3 is described with reference to FIG. 4, FIG. 10, and FIG. 11. As described below, in this case, the ball 67 behaves as if moving through a space warp (moving instantaneously) in the third apparatus. Since the process just before T4 in the time chart of FIG. 4 has already been described with reference to FIG. 3, FIG. 5, and FIG. 6, repeated description is not necessary.

At T4 in FIG. 4, when a predetermined operation (an appropriate block operation at an appropriate timing) has been performed to the second apparatus (ally's blocker), the ally's blocker succeeds in a block, and block data is transmitted from the second apparatus to the first apparatus, the third apparatus, and the fourth apparatus. The block data is data indicating a moving speed, a moving direction, etc., of the blocked ball which are determined based on the content of the predetermined operation. On the basis of the data, on the game screens of the first to fourth apparatuses, the ball changes its direction and moves toward the opponent-side court 62.

Figure 10:
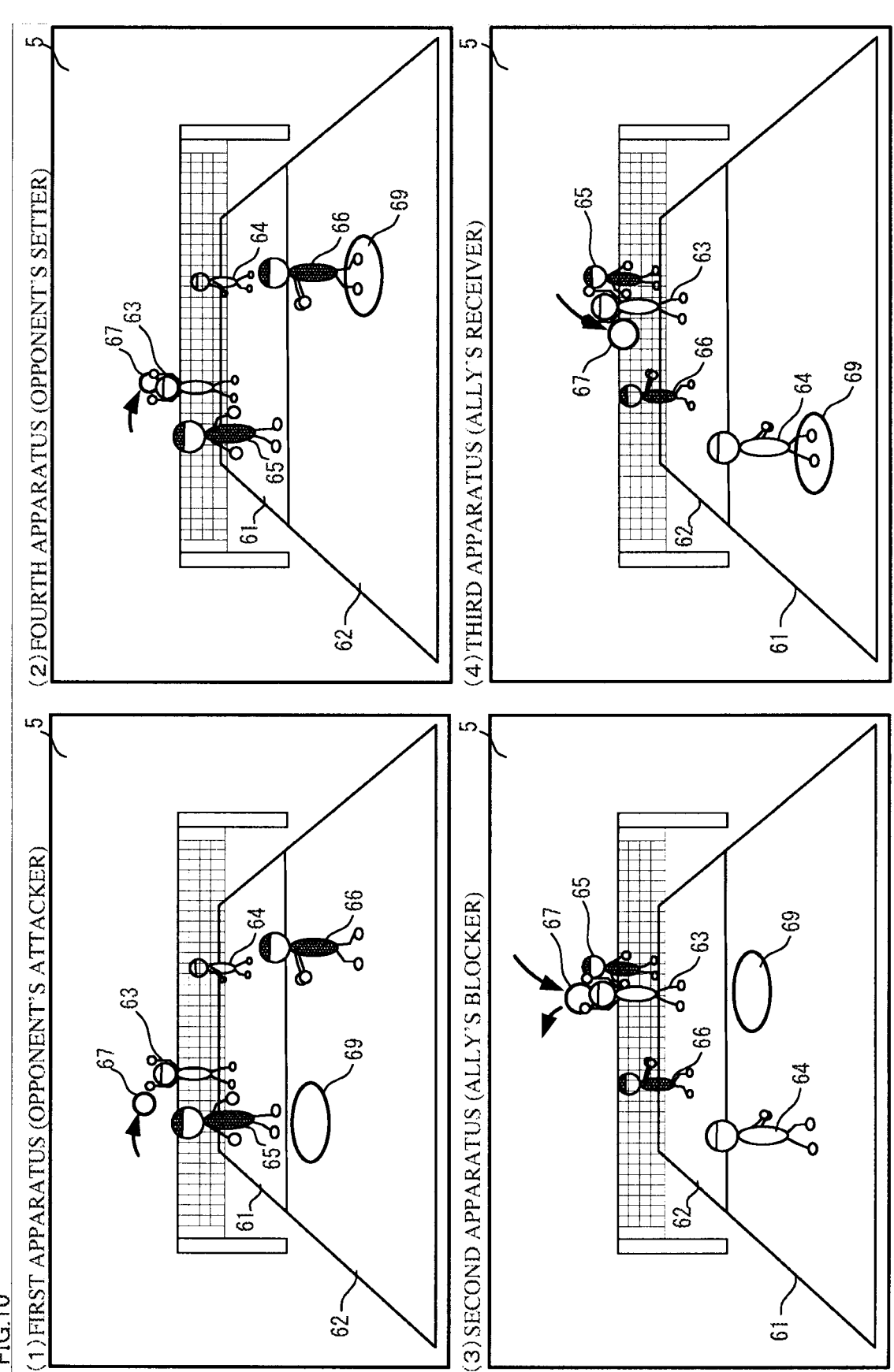
FIG. 10 illustrates a game screen display.

FIG. 10 shows a non-limiting example of the game screens of the first to fourth apparatuses at T4 in FIG. 4. As shown in (3) of FIG. 10, on the game screen of the second apparatus (ally's blocker), a display in which the character 63 operated by the second apparatus blocks the ball 67 is performed. Meanwhile, as shown in (4) of FIG. 10 and (3) of FIG. 4, on the game screen of the third apparatus (ally's receiver), since the third apparatus has not yet received the block data, a display in which the ball 67 passes by the position of the character 63 (ally's blocker) is performed. Likewise, as shown in (2) of FIG. 10, on the game screen of the second apparatus (opponent's setter), since the second apparatus has not yet received the block data, a display in which the ball 67 passes by the position of the character 63 (ally's blocker) is performed. Here, as shown in (1) of FIG. 10 and (1) of FIG. 4, on the game screen of the first apparatus (opponent's attacker), since the start of movement of the ball 67 is delayed (by the reciprocation communication delay time) due to the hit stop as compared to the virtual spaces of the second to fourth apparatuses, the ball 67 is moving in front of the character 63.

Next, at T5 in FIG. 4, each of the first apparatus, the third apparatus, and the fourth apparatus receives the block data and performs a display in which the character 63 blocks the ball 67 and thereby the ball 67 changes its direction and moves toward the opponent-side court 62. The second apparatus also performs a display in which the ball 67 changes its direction due to the block and moves toward the opponent-side court 62.

Figure 11:
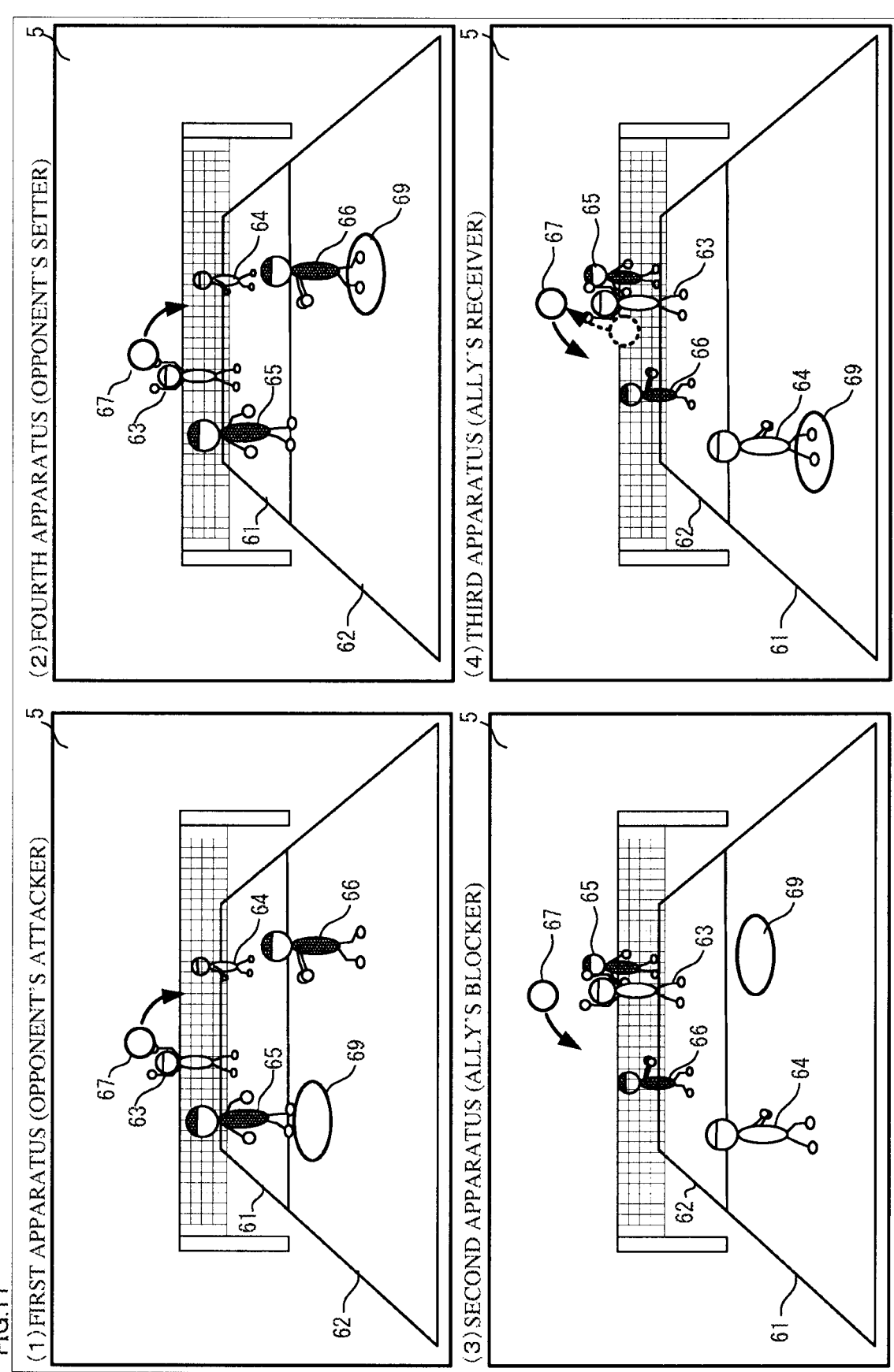
FIG. 11 illustrates a game screen display.

FIG. 11 shows a non-limiting example of the game screens of the first to fourth apparatuses at T5 in FIG. 4. As shown in (1) to (4) of FIG. 11, on the game screens (virtual spaces) of the first to fourth apparatuses (opponent's attacker, opponent's setter, ally's blocker, ally's receiver), the character 63 blocks the ball 67 and thereby the ball 67 changes its direction and moves toward the opponent-side court 62. As shown in (4) of FIG. 11 and (3) of FIG. 4, on the game screen (virtual space) of the third apparatus (ally's receiver), a control is performed such that the ball 67 having passed by the position of the character 63 (ally's blocker) (see (4) of FIG. 10) is moved based on the received block data. At this time, in the virtual space of the third apparatus, since a large difference occurs between the position of the ball 67 before reception of the block data by the third apparatus and the position of the ball 67 having been moved based on the received block data, a display in which the ball 67 moves through a space warp (moves instantaneously) and the block succeeds is performed. Likewise, also in the second apparatus, a display in which the ball 67 moves through a space warp and the block succeeds is performed.

According to the first countermeasure against communication delay described above, on the game screen (first virtual space) of the first apparatus (opponent's attacker), hit stop is performed for a reciprocal communication delay time. Therefore, on the game screen of the first apparatus (opponent's attacker), it is possible to avoid an unnatural display in which, due to the communication delay of the bump data, the ball 67 having landed the floor moves through a space warp and thereby a bump succeeds (see (1), (3) of FIG. 3). Moreover, it is possible to avoid an unnatural display in which, due to the communication delay of the block data, the ball 67 having passed by the character 63 (ally's blocker) moves through a space warp and thereby a block succeeds (see (1), (2) of FIG. 4).

On the other hand, in the first countermeasure against communication delay described above, on the game screen (second virtual space) of the second apparatus (ally's blocker), a display may be performed such that the ball 67 having landed in the ally-side court 62 moves through a space warp (moves instantaneously and discontinuously) and thereby a bump succeeds (see (3) of FIG. 8, (3) of FIG. 9, and (2) of FIG. 3). Moreover, on the game screen (third virtual space) of the third apparatus (ally's receiver), a display may be performed such that the ball 67 having passed by the position of the character 63 (ally's blocker) moves through a space warp and thereby a block succeeds (see (4) of FIG. 10, (4) of FIG. 11, and (3) of FIG. 4).

[Second Countermeasure Against Communication Delay]

Figure 12:
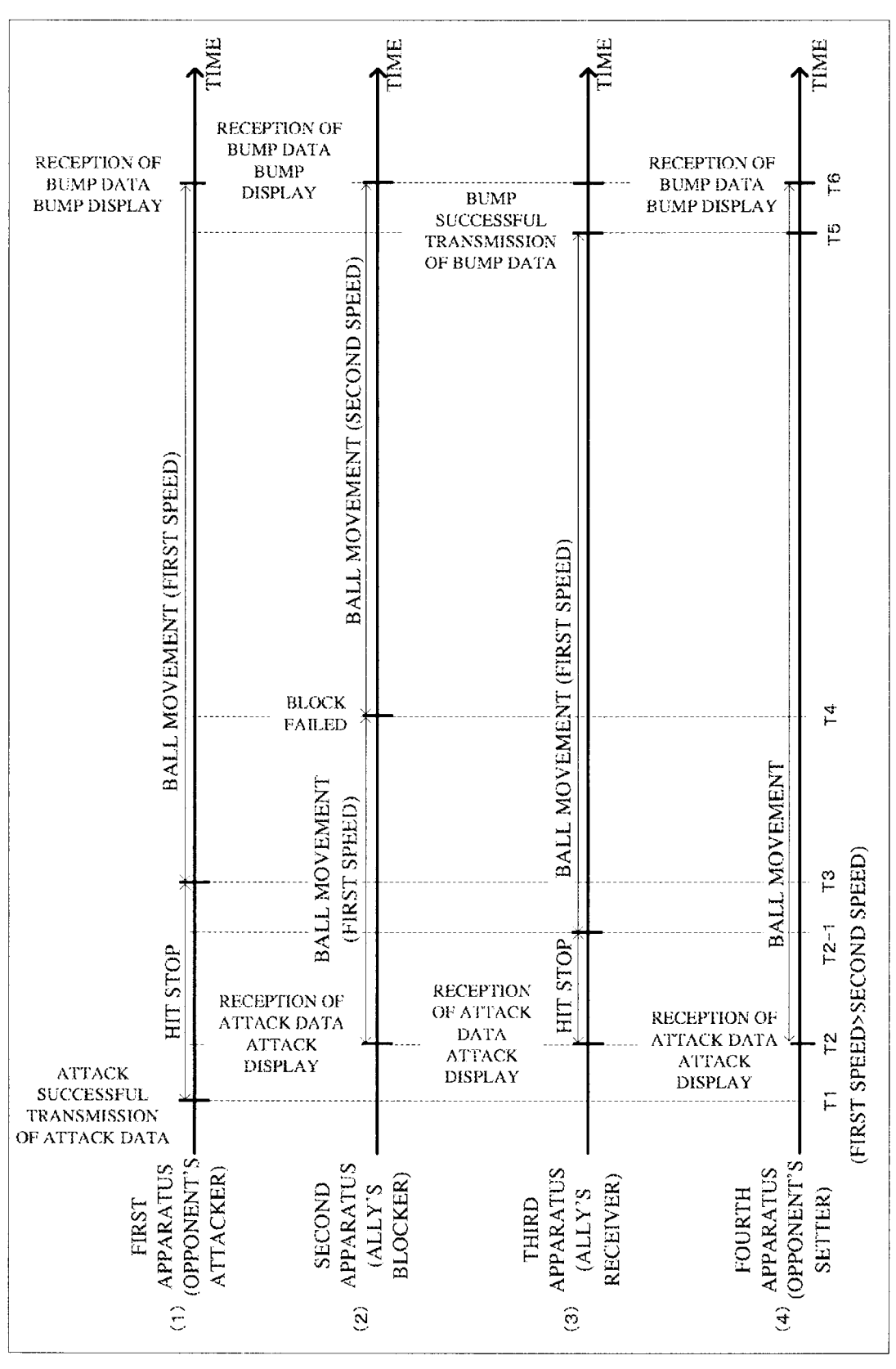
FIG. 12 is a time chart illustrating a second countermeasure against communication delay.
Figure 13:
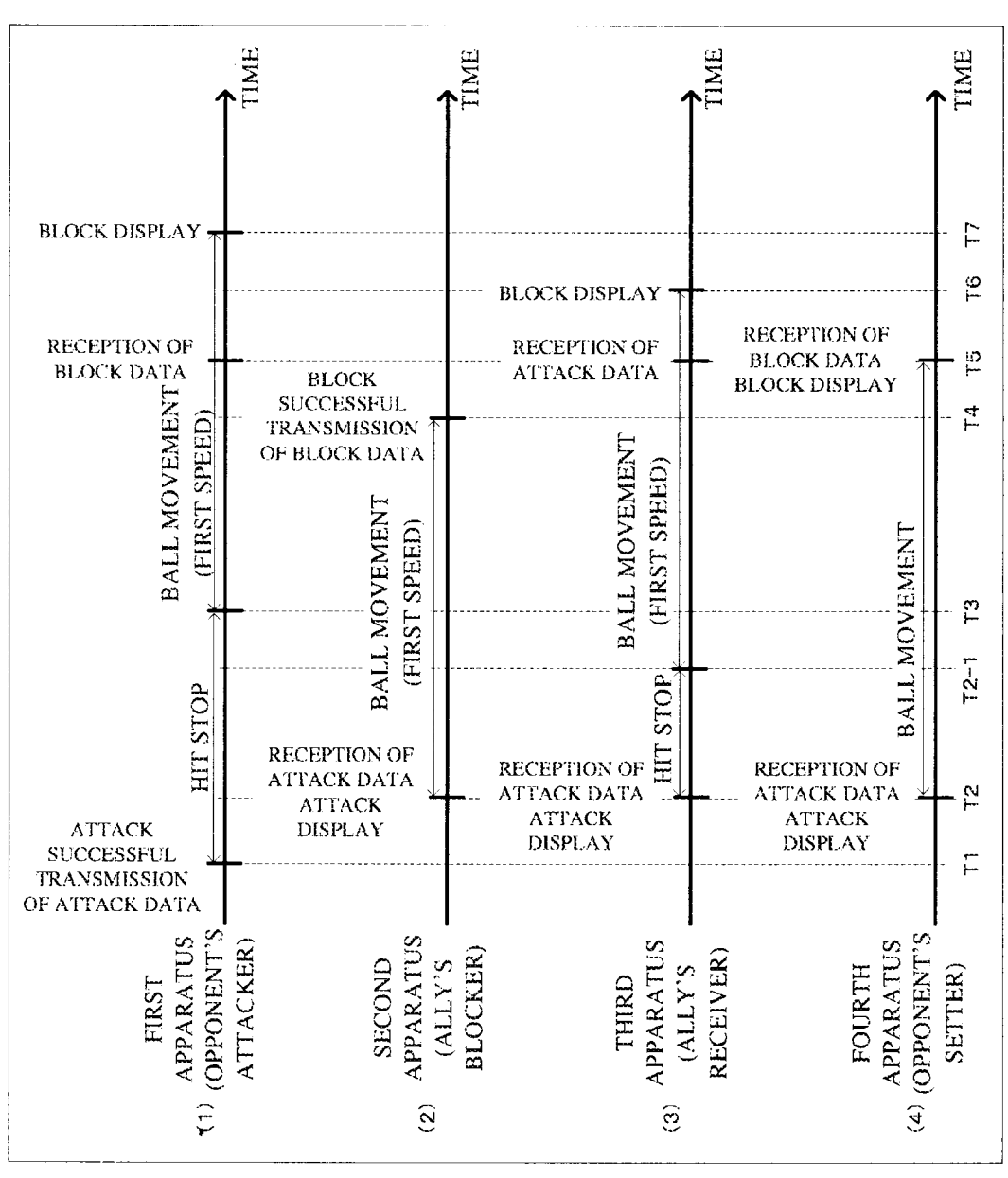
FIG. 13 is a time chart illustrating the second countermeasure against communication delay.

A second countermeasure against communication delay is for avoiding the unnatural display (in which the ball 67 moves through a space warp) in the aforementioned first countermeasure against communication delay. FIG. 12 and FIG. 13 are time charts illustrating the second countermeasure against communication delay according to the exemplary embodiment. FIG. 14 to FIG. 20 illustrate game screen displays (screen displays of the first to fourth apparatuses) at timings in the time charts shown in FIG. 12 and FIG. 13. FIG. 12 corresponds to FIG. 3, FIG. 13 corresponds to FIG. 4, FIG. 14 corresponds to FIG. 6, FIG. 15 corresponds to FIG. 7, FIG. 16 corresponds to FIG. 8, FIG. 17 corresponds to FIG. 9, and FIG. 18 to FIG. 20 correspond to FIG. 10 to FIG. 11.

First, a case where the ally's blocker (second apparatus) fails in a block and the ally's receiver (third apparatus) succeeds in a bump is described with reference to FIG. 12, and FIG. 14 to FIG. 17. Since the process just before T2 in FIG. 12 is the same in content as the process described by using FIG. 3 and FIG. 5, repeated description is not necessary. In this case, if only the first countermeasure against communication delay is used, the following drawback will occur. That is, in the second apparatus (second virtual space), after the ball 67 has passed by the body of the ally's receiver (character 64) and landed in the court, the second apparatus receives bump data indicating that a bump performed by the ally's receiver has succeeded, and reflects this result. As a result, an unnatural behavior of the ball 67, i.e., moving through a space warp (moving instantaneously), may occur in the second apparatus (see (2) of FIG. 3).

At T2 of FIG. 12, each of the second apparatus and the fourth apparatus receives attack data and performs a display in which the character 65 performs an attack on the ball 67 and thereby the ball 67 starts to move. Meanwhile, the third apparatus receives the attack data, performs a display in which the character 65 performs an attack on the ball 67, and starts a hit stop display. Here, the hit stop display is performed during a time period from when data is transmitted from the first apparatus to the other apparatuses (second to fourth apparatuses) to when data is transmitted from the other apparatuses to the first apparatus (i.e., a reciprocal communication delay time). The hit stop display may not necessarily be performed during the reciprocal communication delay time, and may be performed during a time period twice a one-way communication delay time. In the first apparatus, the hit stop display started at T1 is continued. The hit stop display is performed during a time period twice the time period from when data is transmitted from the first apparatus to the other apparatuses (second to fourth apparatuses) to when data is transmitted from the other apparatuses to the first apparatus (i.e., a reciprocal communication delay time). However, the hit stop display may not necessarily be performed during the time period twice the reciprocal communication delay time, and may be performed during a time period four times the one-way communication delay time. For convenience of description, at T2, the second to fourth apparatuses receive the attack data at the same timing. In actuality, however, certain time lags may occur depending on the qualities of communication lines used by the second to fourth apparatuses.

Figure 14:
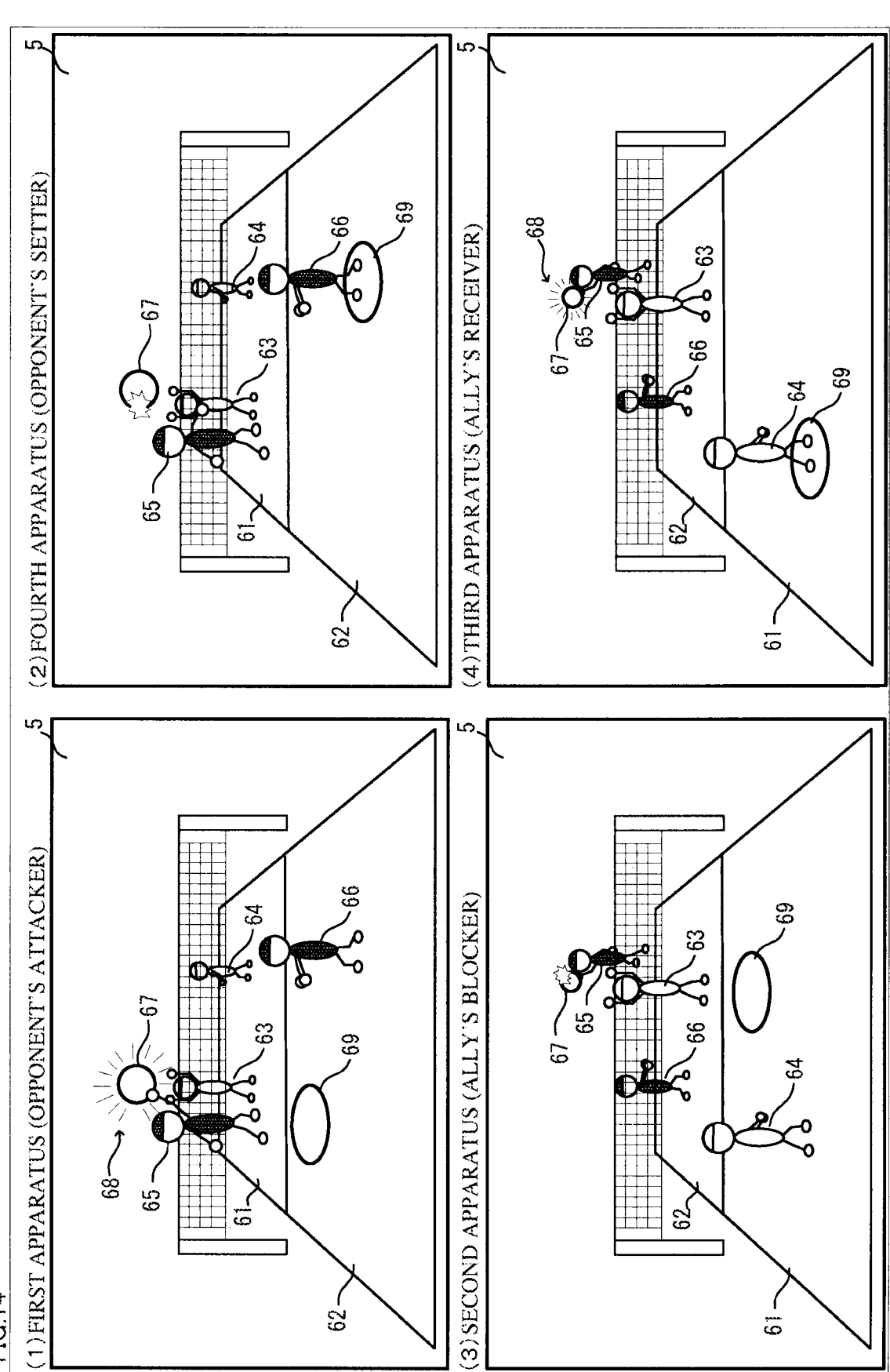
FIG. 14 illustrates a game screen display.

FIG. 14 shows a non-limiting example of the game screens of the first to fourth apparatuses at T2 in FIG. 12. As shown in (1) of FIG. 14, on the game screen (first virtual space) of the first apparatus (opponent's attacker), the hit stop is continued, and a light-emitting display 68 indicating that the ball 67 is in the hit stop state is performed. Moreover, as shown in (4) of FIG. 14, on the game screen (third virtual space) of the third apparatus (ally's receiver), the hit stop has been started, and the light-emitting display 68 indicating that the ball 67 is in the hit stop state is performed. Meanwhile, as shown in (2) and (3) of FIG. 14, on the game screens (second virtual space and fourth virtual space) of the second apparatus and the fourth apparatus (opponent's setter, ally's blocker), the character 65 performs an attack on the ball 67 and thereby the ball 67 starts to move on the basis of the received attack data. As shown in (1) to (4) of FIG. 12, in the virtual spaces provided by at least the first to third apparatuses, the ball 67 moves at the same speed (first speed).

Next, at T2-1 in FIG. 12, on the game screen (third virtual space) of the third apparatus, the hit stop display, having been performed for the reciprocal communication delay time, is ended, and a display in which the ball 67 starts to move (based on the attack data received at T2) is performed (not shown).

Next, at T3 in FIG. 12, on the game screen (first virtual space) of the first apparatus, the hit stop display, having been performed for a period twice the reciprocal communication delay time, is ended, and a display in which the ball 67 starts to move (based on the attack data) is performed (not shown).

Figure 15:
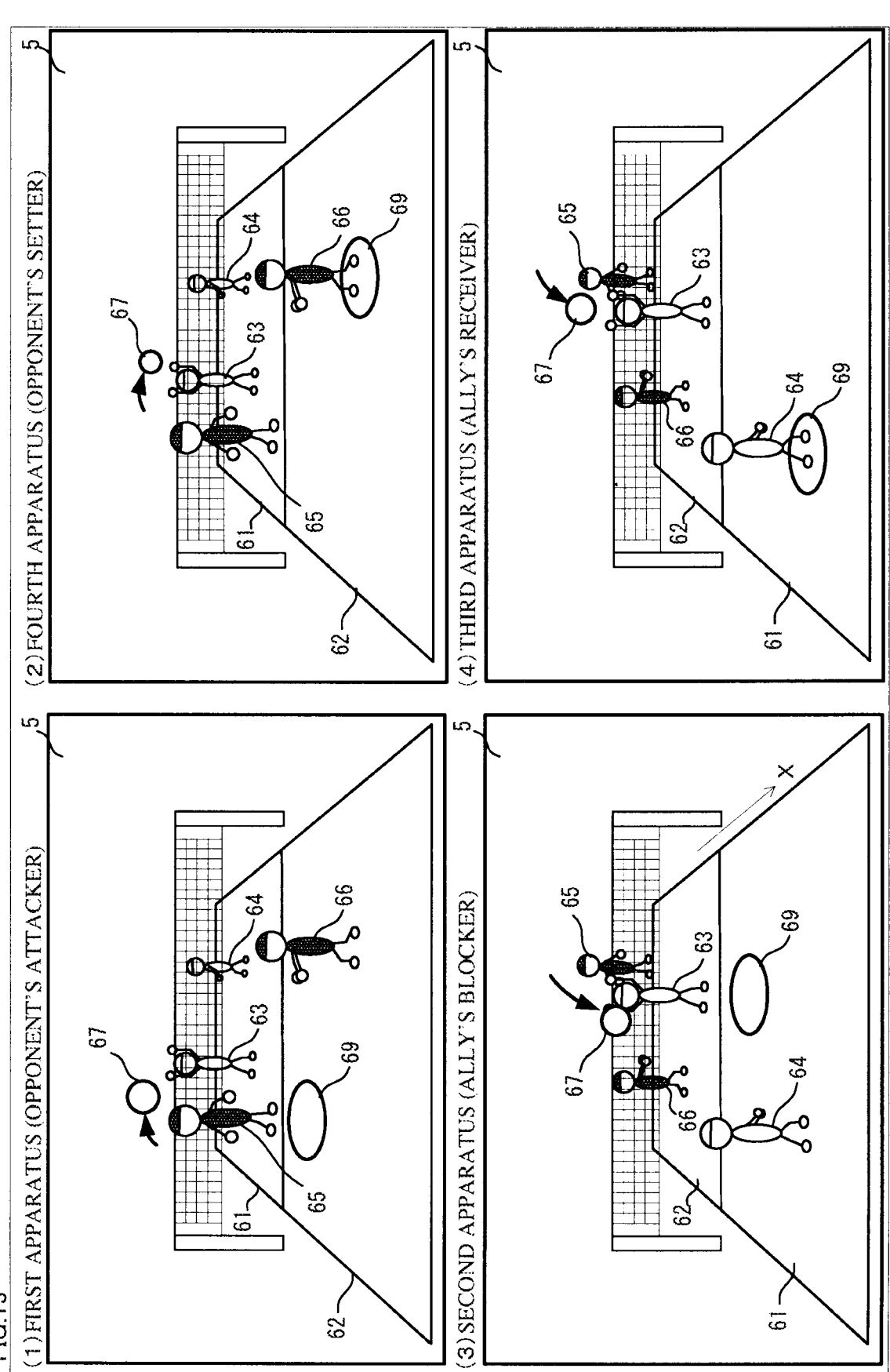
FIG. 15 illustrates a game screen display.

At T4 in FIG. 12, a display in which a block by the second apparatus (ally's blocker) fails and the ball 67 passes by the position of the character 63 is performed. FIG. 15 shows a non-limiting example of the game screens of the first to fourth apparatuses at T4 in FIG. 12. As shown in (3) of FIG. 15, on the game screen of the second apparatus (ally's blocker), the ball 67 passes by the position of the character 63. Meanwhile, as shown in (1) and (4) of FIG. 15, on the game screens of the first apparatus and the third apparatus (opponent's attacker and ally's receiver) having performed the hit stop, the ball 67 is moving in front of the character 63.

As shown in (2) of FIG. 12, at T4, in the second virtual space of the ally's blocker (second apparatus), the moving speed of the ball 67 is changed from the first speed to a second speed lower than the first speed.

Next, at T5 in FIG. 12, when a predetermined operation (an appropriate bump operation at an appropriate timing) has been performed to the third apparatus (ally's receiver), the ally's receiver succeeds in a bump, and bump data is transmitted from the third apparatus to the first apparatus, the second apparatus, and the fourth apparatus.

Figure 16:
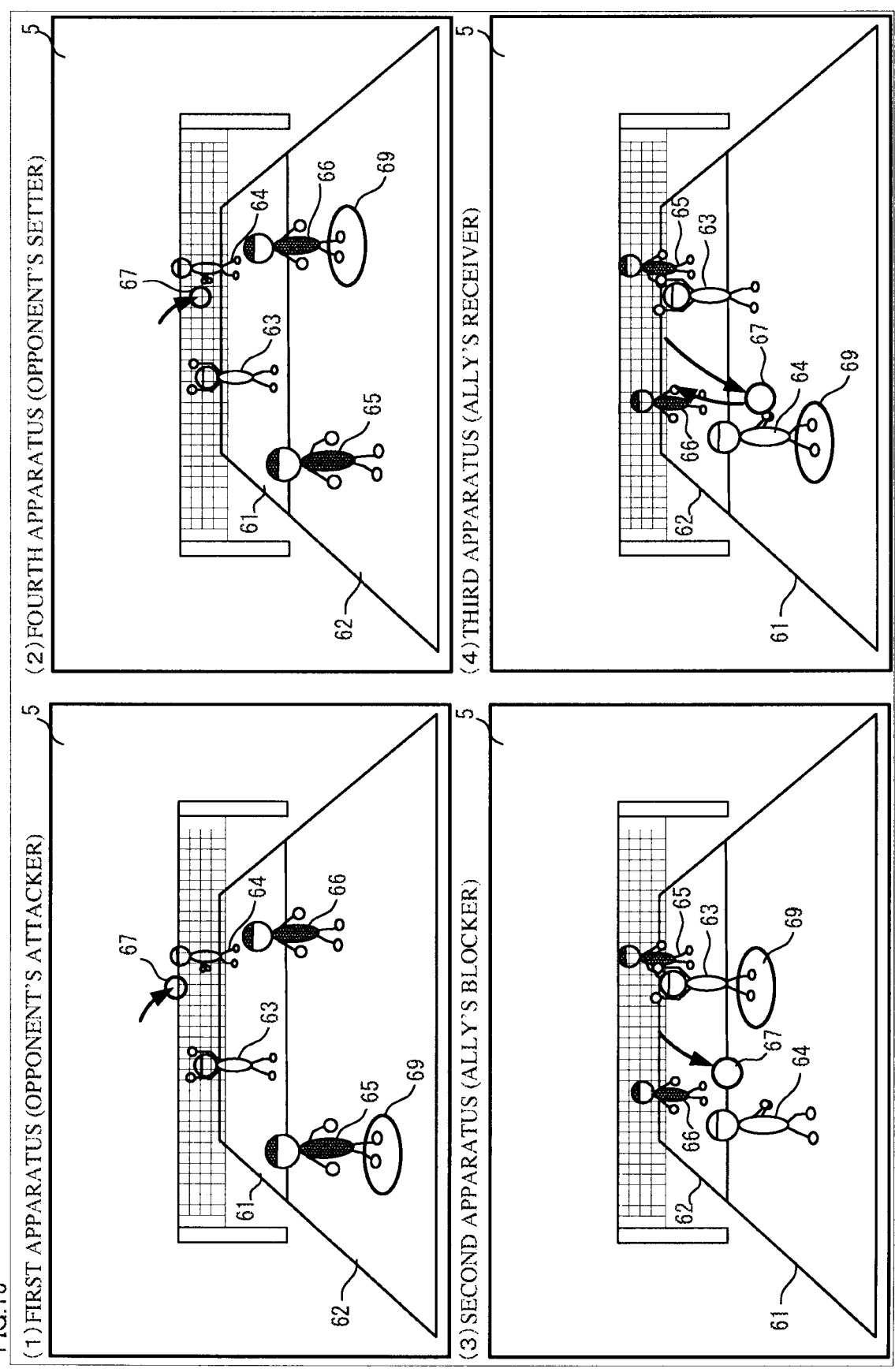
FIG. 16 illustrates a game screen display.

FIG. 16 shows a non-limiting example of the game screens of the first to fourth apparatuses at T5 in FIG. 12. As shown in (4) of FIG. 16, on the game screen of the third apparatus (ally's receiver), a display in which the character 64 operated by the third apparatus bumps the ball 67 is performed. As shown in (3) of FIG. 16 and (2) of FIG. 12, on the game screen of the second apparatus (ally's blocker), since the ball 67 is moving at the second speed lower than the first speed and the second apparatus has not yet received the bump data, the ball 67 is moving in front of the character 64. As shown in (1) of FIG. 16 and (1) of FIG. 12, on the game screen of the first apparatus (opponent's attacker), since the start of movement of the ball 67 is delayed by the hit stop and the first apparatus has not yet received the bump data, the ball 67 is moving in front of the character 64.

Figure 17:
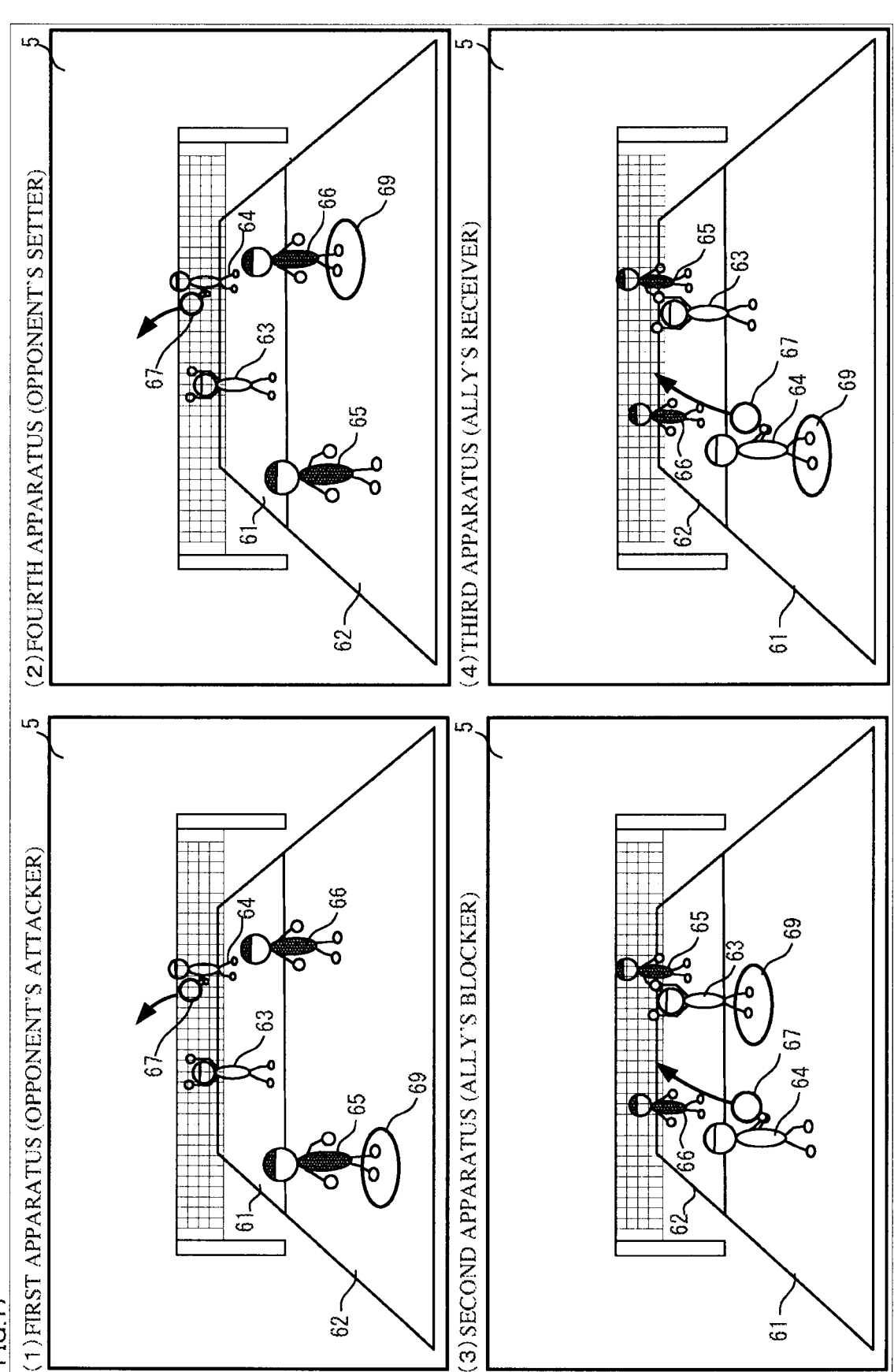
FIG. 17 illustrates a game screen display.

Next, at T6 in FIG. 12, each of the first apparatus, the second apparatus, and the fourth apparatus receives the bump data, and performs a display in which the character 64 bumps the ball 67 and thereby the ball 67 changes its direction and moves, and the third apparatus also performs a display in which the ball 67 having been bumped changes its direction and moves. FIG. 17 shows a non-limiting example of the game screens of the first to fourth apparatuses at T6 in FIG. 12. As shown in (1) to (4) of FIG. 17, on the game screens (virtual spaces) of the first to fourth apparatuses (opponent's attacker, opponent's setter, ally's blocker, ally's receiver), the character 64 bumps the ball 67 and thereby the ball 67 changes its direction and moves.

As described above, in the second countermeasure against communication delay, at T4 in FIG. 12, the moving speed of the ball 67 in the virtual space of the second apparatus (ally's blocker) is changed to the second speed lower than the first speed, thereby avoiding occurrence of an unnatural display on the game screen of the second apparatus (blocker) in which the ball 67 having landed in the ally-side court 62 moves through a space warp and thereby a bump succeeds (see (3) of FIG. 8, (3) of FIG. 9, and (2) of FIG. 3).

Next, a case where the ally's blocker (second apparatus) succeeds in a block at T4 in FIG. 12 is described with reference to FIG. 13, and FIG. 18 to FIG. 20. Since the process before T4 in FIG. 13 is the same in content as the process described by using FIG. 12 and the like, repeated description is not necessary. In this case, if the aforementioned first countermeasure against communication delay (see FIG. 4) is used, the following drawback will occur. That is, on the game screen of the third apparatus (ally's receiver), after the ball 67 has passed by the position of the ally's blocker (character 63), the third apparatus receives block data indicating that a block by the ally's blocker has succeeded, and reflects the result. As a result, an unnatural behavior of the ball 67, i.e., moving through a space warp, may occur on the game screen of the third apparatus.

At T4 in FIG. 13, when a predetermined operation (an appropriate block operation at an appropriate timing) has been performed to the second apparatus (ally's blocker), the ally's blocker succeeds in a block, and block data is transmitted from the second apparatus to the first apparatus, the third apparatus, and the fourth apparatus.

Figure 18:
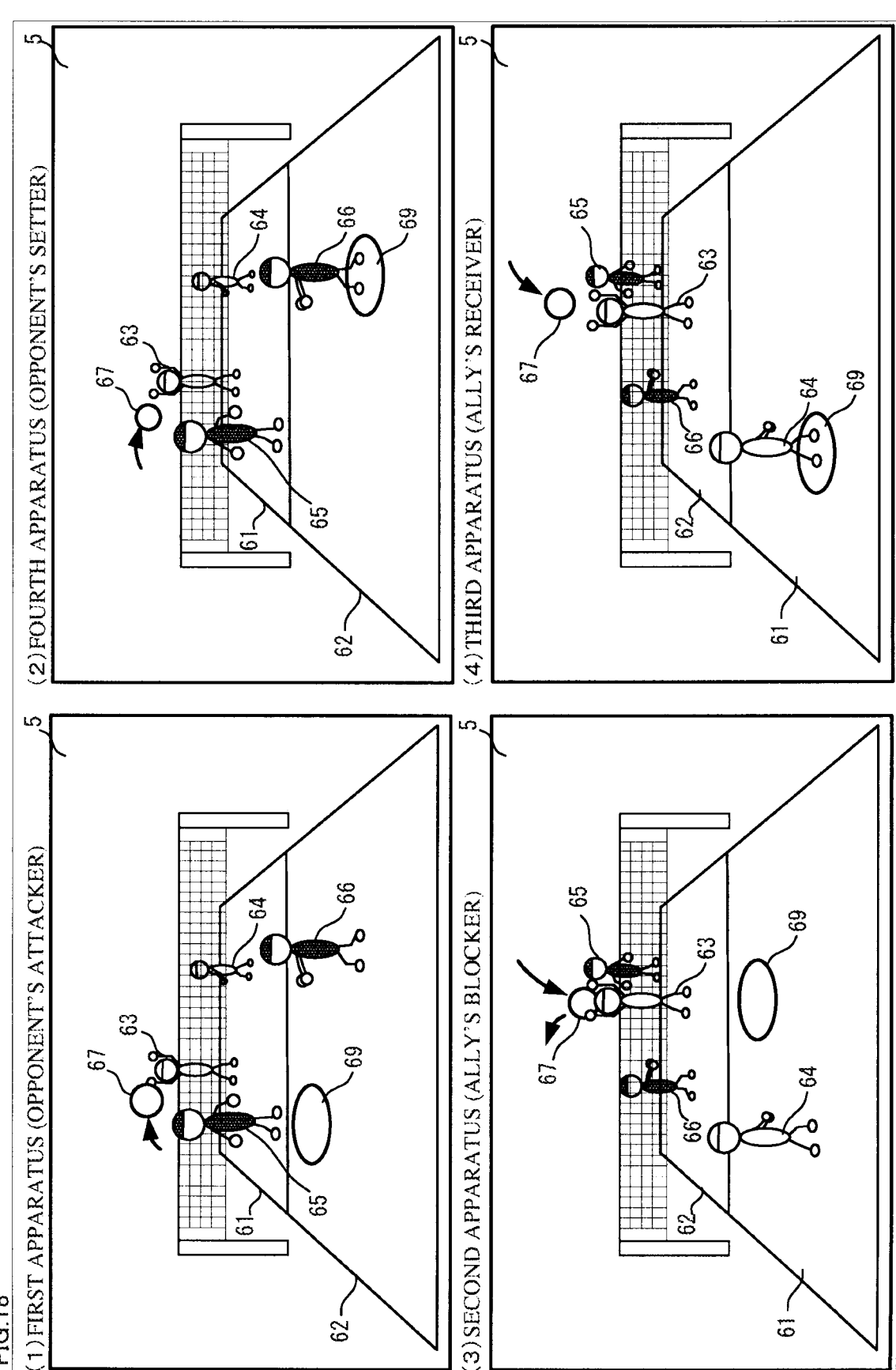
FIG. 18 illustrates a game screen display.

FIG. 18 shows a non-limiting example of the game screens of the first to fourth apparatuses at T4 in FIG. 13. As shown in (3) of FIG. 18, on the game screen of the second apparatus (ally's blocker), a display in which the character 63 operated by the second apparatus blocks the ball 67 is performed. Meanwhile, as shown in (4) of FIG. 18 and (3) of FIG. 13, on the game screen of the third apparatus (ally's receiver), since the start of movement of the ball 67 is delayed by the hit stop and the third apparatus has not yet received the block data, the ball 67 is moving in front of the character 63 (ally's blocker). Likewise, as shown in (1) of FIG. 18 and (1) of FIG. 13, on the game screen of the first apparatus (opponent's attacker), since the start of movement of the ball 67 is delayed by the hit stop and the first apparatus has not yet received the block data, the ball 67 is moving in front of the character 63 (ally's blocker).

Next, at T5 in FIG. 13, each of the first apparatus, the third apparatus, and the fourth apparatus receives the block data transmitted from the second apparatus, and a display in which the character 63 blocks the ball 67 is performed on the game screen of the fourth apparatus (not shown).

Figure 19:
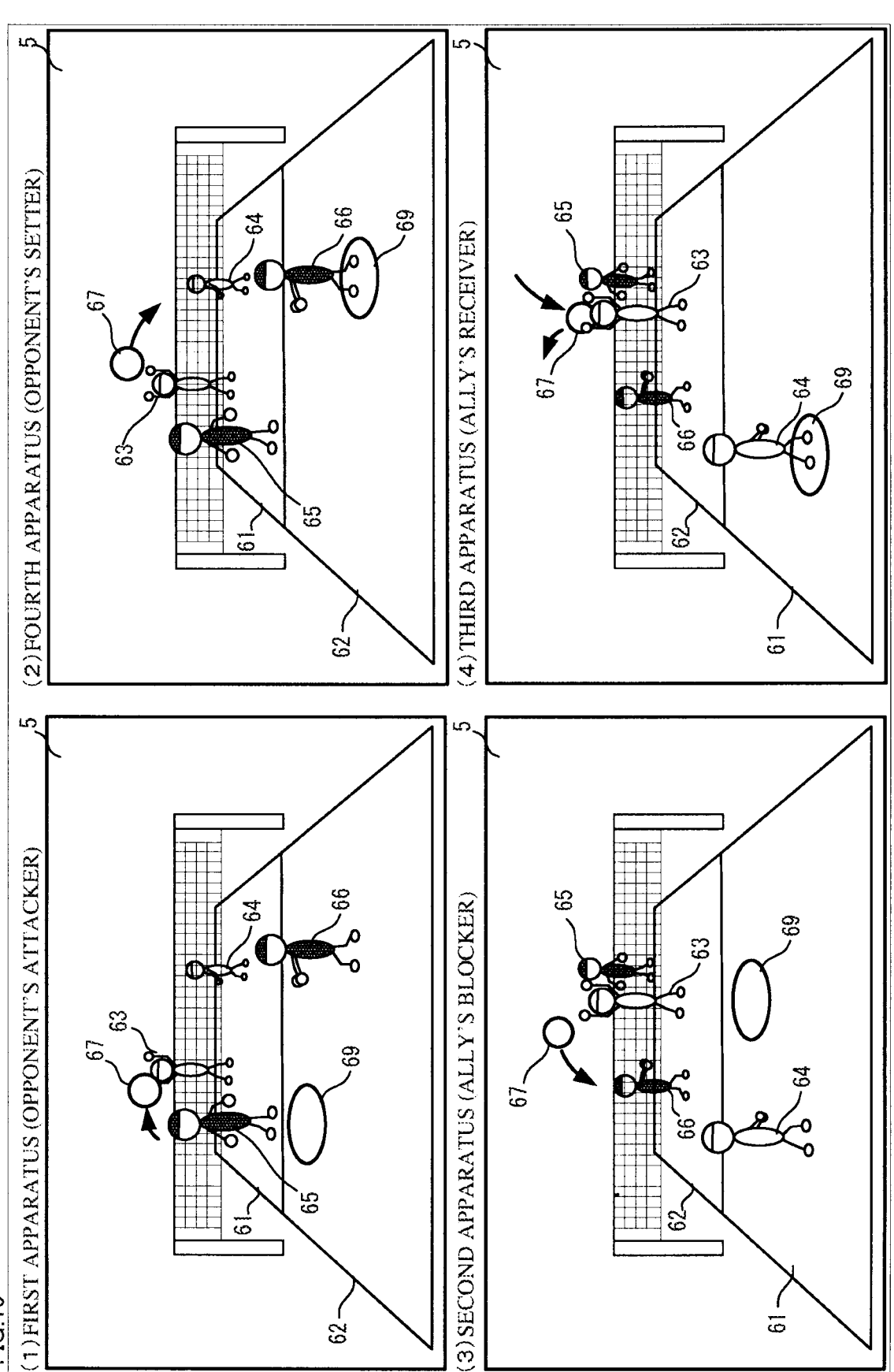
FIG. 19 illustrates a game screen display.

Next, at T6 in FIG. 13, on the basis of the block data received at T5, the third apparatus performs a display in which the character 63 blocks the ball 67 and thereby the ball 67 changes its direction and moves toward the opponent-side court 62. FIG. 19 shows a non-limiting example of the game screens of the first to fourth apparatuses at T6 in FIG. 13. As shown in (4) of FIG. 19, on the game screen (virtual space) of the third apparatus (ally's receiver), the character 63 blocks the ball 67 and thereby the ball 67 changes its direction and starts to move toward the opponent-side court 62. Meanwhile, on the game screen of the first apparatus (opponent's attacker), since the start of movement of the ball 67 is delayed by the hit stop (see (1) of FIG. 13), the ball 67 is moving in front of the character 63. On the game screens of the second apparatus (ally's blocker) and the fourth apparatus (opponent's setter), the ball 67 has already started to move toward the opponent-side court 62 due to the block.

Figure 20:
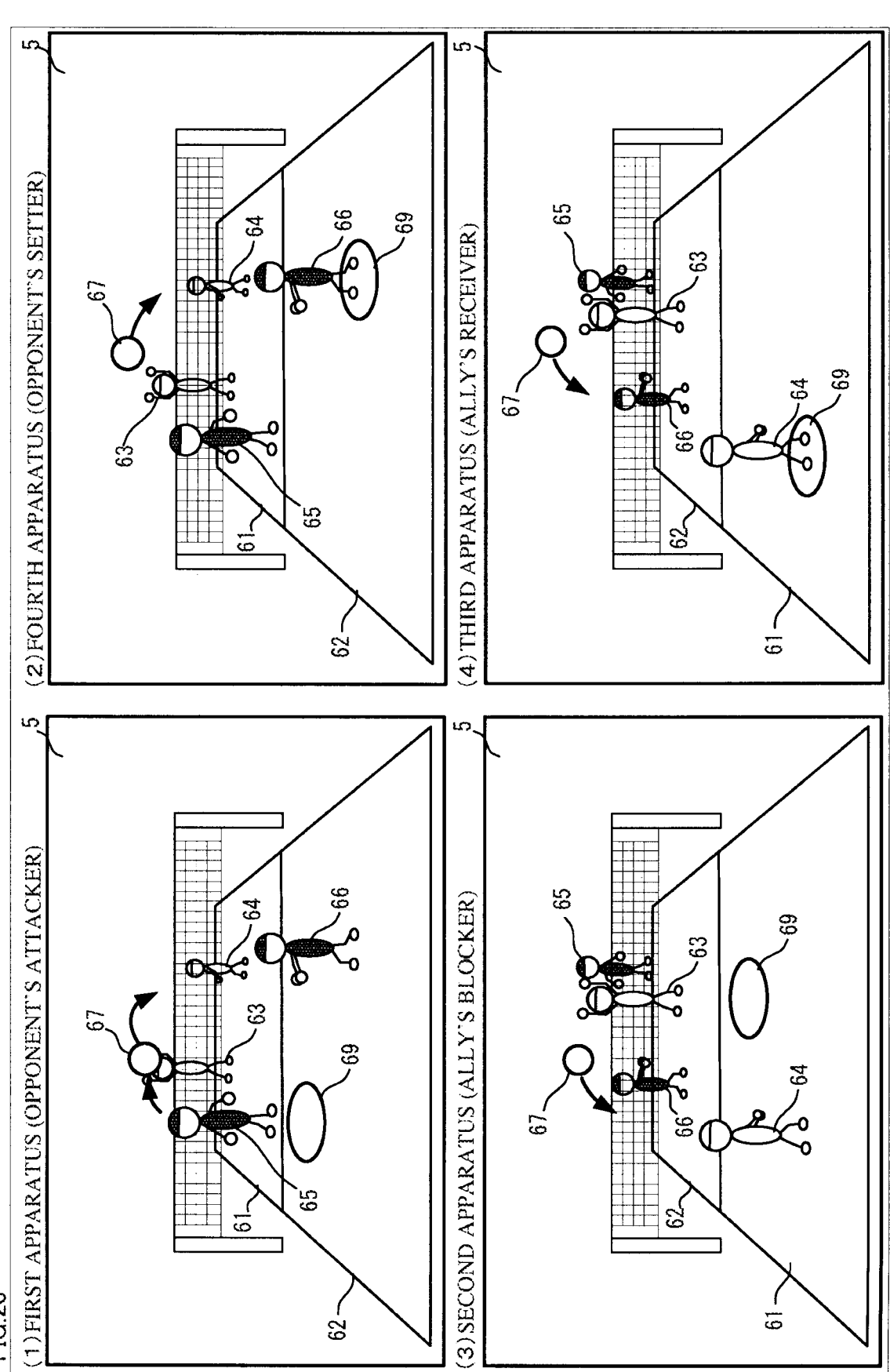
FIG. 20 illustrates a game screen display.

Next, at T7 in FIG. 13, on the basis of the block data received as T5, the first apparatus performs a display in which the character 63 blocks the ball 67 and thereby the ball 67 changes its direction and moves toward the opponent-side court 62. FIG. 20 shows a non-limiting example of the game screens of the first to fourth apparatuses at T7 in FIG. 13. As shown in (1) of FIG. 20, on the game screen of the first apparatus (opponent's attacker), the character 63 blocks the ball 67 and thereby the ball 67 changes its direction and starts to move toward the opponent-side court 62. Meanwhile, on the game screens (virtual spaces) of the second apparatus (ally's blocker), the third apparatus (ally's receiver), and the fourth apparatus (opponent's setter), the ball 67 has already started to move toward the opponent-side court 62 due to the block.

As described above, according to the second countermeasure against communication delay, during a period after T2 in FIG. 13, in the virtual space of the third apparatus (ally's receiver), movement of the ball 67 is started after a predetermined waiting time caused by execution of the hit stop has passed (see (3) of FIG. 13), thereby avoiding occurrence of an unnatural display in which the ball 67 having passed by the position of the character 63 (ally's blocker) moves through a space warp (moves instantaneously and discontinuously) and thereby a block succeeds, on the game screen of the third apparatus (see (4) of FIG. 10, (4) of FIG. 11, and (3) of FIG. 4).

As described above, according to the second countermeasure against communication delay, in the first to fourth apparatuses performing the on-line competition game (volleyball game), a natural display that does not cause a sense of discomfort can be achieved.

In the virtual spaces of the first to fourth apparatuses, in a period before an attack is performed (normal period), the moving speed of the ball 67 is controlled to be the first speed (see FIG. 12 and the like; the first speed may be regarded as the normal speed). Also, in a period after a bump (and a block) has been performed (normal period), the moving speed of the ball 67 is controlled to be the first speed. An attack, a block, and a bump are game events, in which the moving speed, the moving direction, etc., of the ball 67 are determined.

[Details of Information Processing of the Exemplary Embodiment]

Next, with reference to FIG. 21 to FIG. 24, information processing according to the exemplary embodiment (second countermeasure against communication delay) will be described in detail.

[Data to be Used]

Figure 21:
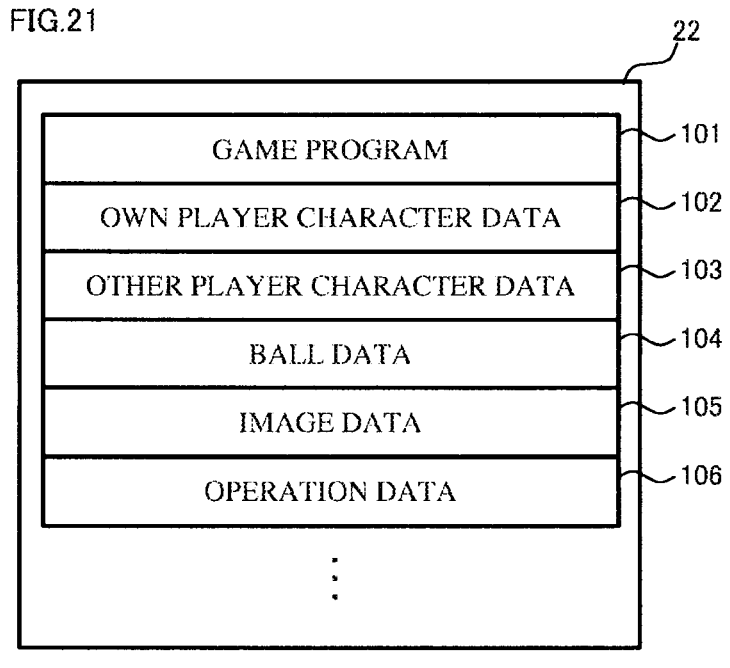
FIG. 21 illustrates data used for game processing.

Various types of data to be used in this game processing will be described. FIG. 21 shows a non-limiting example of a program and data stored in the storage section 22 of the game apparatus 2. The storage section 22 has, stored therein, a game program 101, own player character data 102, other player character data 103, ball data 104, image data 105, operation data 106, and the like.

The game program 101 is a program for executing the game processing according to the exemplary embodiment.

The own player character data 102 is data that defines an own player character (a character operated by an own game apparatus 2) in a virtual space (of the own game apparatus 2) of this game. The own player character data 102 defines a position, an orientation, a posture, a role, etc., of the own player character. The role is any of the roles (a server, a receiver, a setter, an attacker, and a blocker) described with reference to FIG. 2 and the like, and the roles are changed in a predetermined order.

The other player character data 103 is data that defines another player character (a character operated by another game apparatus 2) in the virtual space (of the own game apparatus 2) of this game. The other player character data 102 defines a position, an orientation, a posture, etc., of the other player character. The other player character data 103 is updated based on data that is received from the other game apparatus at a predetermined time interval (e.g., 50 milliseconds).

The ball data 104 is data that defines the ball 67 in the virtual space (of the own game apparatus 2) of this game. The ball data 104 defines a position, a moving direction, a moving speed, etc., of the ball 67. By using the ball data 104, movement of the ball 67 is controlled in the virtual space of the own game apparatus 2.

The image data 105 is image data of the own player character, the other player character, the ball, etc.

The operation data 106 is data indicating operations performed to the own game apparatus 2.

[Details of Game Processing]

Figure 22:
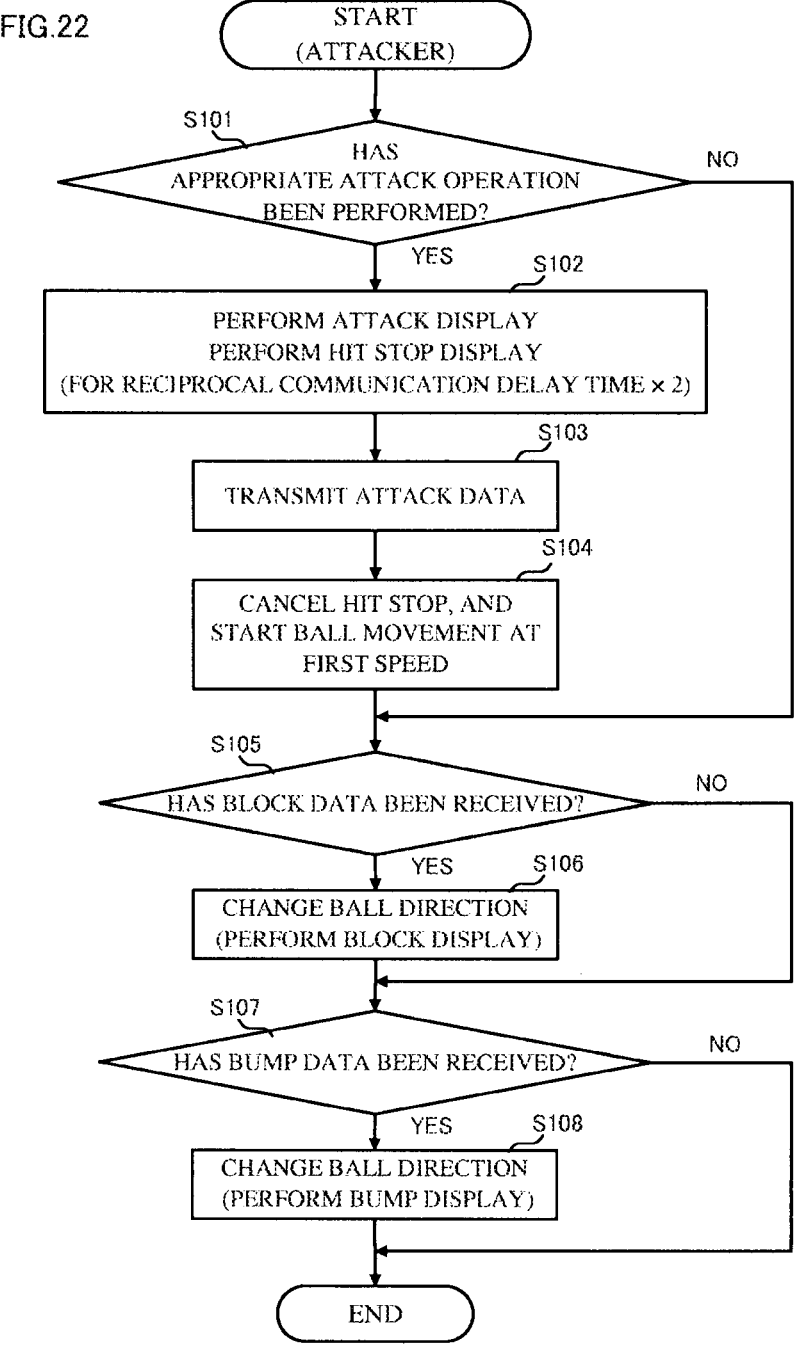
FIG. 22 is a non-limiting example of a flowchart for a case where an own player character is an attacker.
Figure 23:
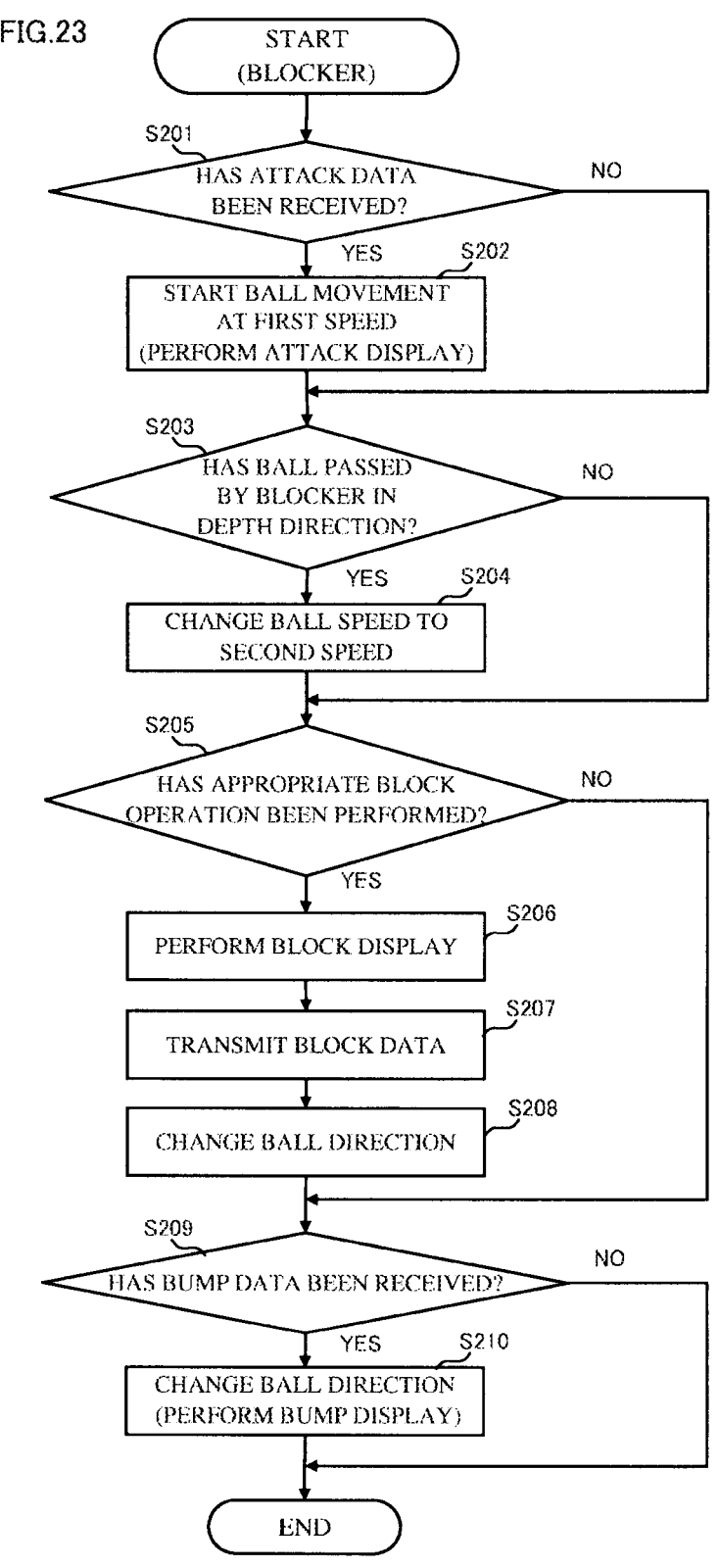
FIG. 23 is a non-limiting example of a flowchart for a case where the own player character is a blocker.
Figure 24:
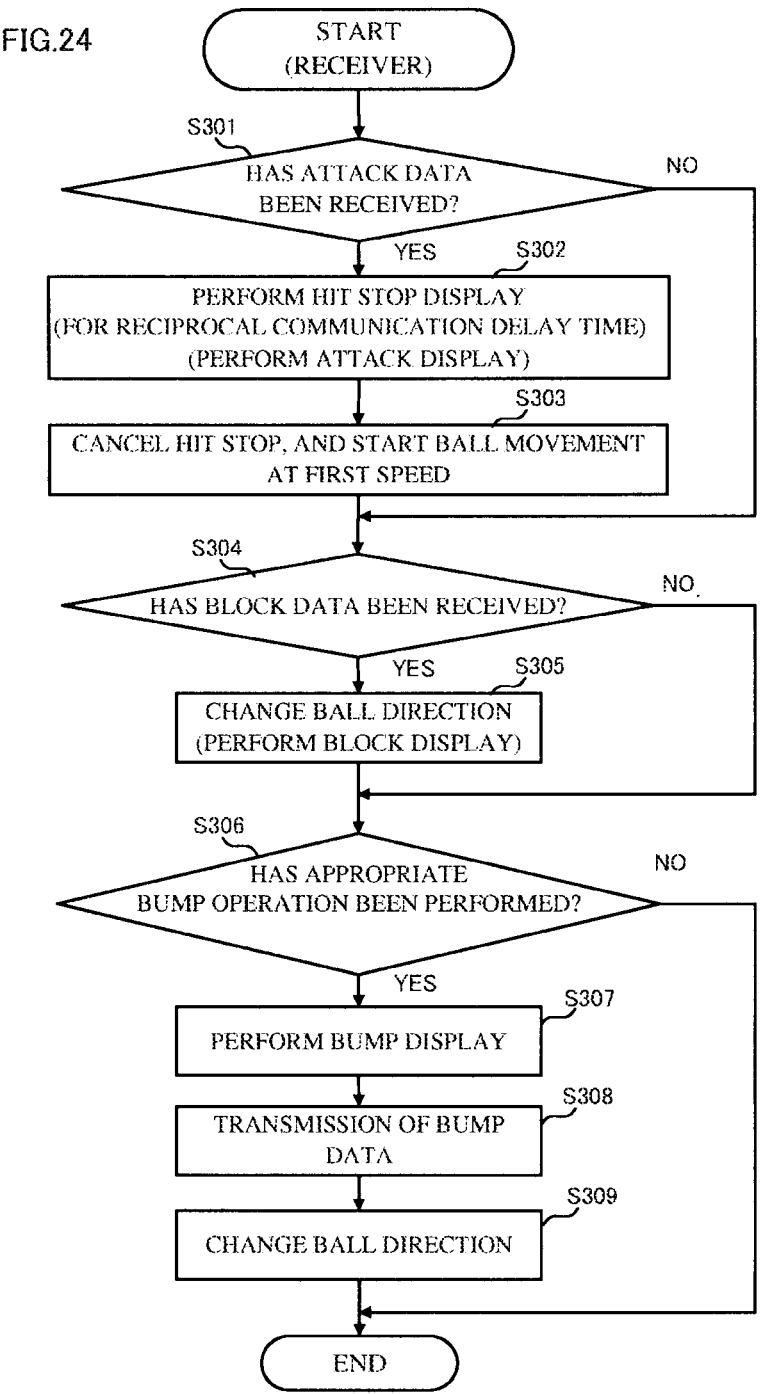
FIG. 24 is a non-limiting example of a flowchart for a case where the own player character is a receiver.

Next, the game processing according to the exemplary embodiment (second countermeasure against communication delay) will be described in detail with reference to flowcharts. FIG. 22 to FIG. 24 are non-limiting examples of flowcharts showing the game processing of the exemplary embodiment (second countermeasure against communication delay) in detail.

[Processing for Attacker]

The game processing shown in FIG. 22 is performed when the own player character takes the role of an attacker. The role of the own player character is changed based on the current role included in the own player character data 102.

In step S101 in FIG. 22, the processor 21 determines whether or not an appropriate attack operation has been performed. Specifically, on the basis of the own player character data 102, the ball data 104, and the operation data 106, the processor 21 determines whether or not an appropriate attack operation has been performed by the user at an appropriate timing. When the determination in step S101 is YES, the process proceeds to step S102. When the determination is NO, the process to step S105.

In step S102, the processor 21 performs an attack display, and performs hit stop. Specifically, the processor 21 causes the own player character to perform an attack on the ball 67 in the virtual space, and performs hit stop to start (perform) a process of stopping the progress of time in the virtual space for a predetermined waiting time (a time twice the reciprocal communication delay time) (see T1 in (1) of FIG. 12). A game image obtained by capturing the virtual space with a virtual camera is displayed by the display section 5. Thereafter, the process proceeds to step S103.

In step S103, the processor 21 causes the wireless communication section 23 to transmit attack data to three other game apparatuses 2 via the Internet (see T1 in (1) of FIG. 12). The attack data is data determined based on the content of the attack operation, and indicates the moving speed (i.e., the first speed), the moving direction, etc., of the attack ball. Thereafter, the process proceeds to step S104.

In step S104, the processor 21 cancels the hit stop, and starts movement of the attack ball 67 at the first speed on the basis of the attack data (see T3 in (1) of FIG. 12). Thereafter, the process proceeds to step S105.

In step S105, the processor 21 determines whether or not block data has been received from another game apparatus 2 (apparatus of a blocker) (see T5 in (1) of FIG. 13). The block data is transmitted in step S207 in FIG. 23 described later. When the determination in step S105 is YES, the process proceeds to step S106. When the determination is NO, the process proceeds to step S107.

In step S106, the processor 21 changes the moving direction of the ball 67. Specifically, on the basis of the received block data, the processor 21 changes the moving direction of the ball 67 blocked by another player character (blocker) to a direction toward the ally-side court (see T7 in (1) of FIG. 13). Thereafter, the process proceeds to step S107.

In step S107, the processor 21 determines whether or not bump data has been received from another game apparatus 2 (apparatus of a receiver) (see T6 in (1) of FIG. 12). The bump data is transmitted in step S308 in FIG. 24 described later. When the determination in step S107 is YES, the process proceeds to step S108. When the determination is NO, the processing for attacker is ended.

In step S108, the processor 21 changes the moving direction of the ball 67. Specifically, on the basis of the received bump data, the processor 21 changes, in the opponent-side court, the moving direction of the ball 67 bumped by another player character (receiver) (see T6 in (1) of FIG. 12). Thereafter, the processing for attacker is ended.

[Processing for Blocker]

The game processing shown in FIG. 23 is performed when the own player character takes the role of a blocker.

In step S201, the processor 21 determines whether or not attack data has been received from another game apparatus 2 (apparatus of an attacker) (see T2 in FIG. 12). The attack data is transmitted in step S103 in FIG. 22. When the determination in step S201 is YES, the process proceeds to step S202. When the determination is NO, the process proceeds to step S203.

In step S202, the processor 21 starts movement of the ball 67 at the first speed. Specifically, on the basis of the received attack data, the processor 21 starts movement of the ball 67 hit by another player character (attacker), at the first speed, toward the ally-side court (see T2 in (2) of FIG. 12). Thereafter, the process proceeds to step S203.

In step S203, the processor 21 determines whether or not the attack ball 67 has passed by the own player character (blocker) in the depth direction of the court. Specifically, on the basis of the own player character data 102 and the ball data 104, the processor 21 determines whether or not a center point of the ball 67 has passed a center point of the own player character (blocker) in the depth direction of the court (X-axis direction indicated on the right side of the court shown in (3) of FIG. 15), i.e., whether or not the blocker has failed in a block (see T4 in (2) of FIG. 12). When the determination in step S203 is YES, the process proceeds to step S204. When the determination is NO, the process proceeds to step S205.

In step S204, the processor 21 changes the moving speed of the ball 67 from the first speed to the second speed (see T4 in (2) of FIG. 12). As already described, the magnitude of the moving speed of the ball 67 has a relationship of first speed>second speed. Thereafter, the process proceeds to step S205.

In step S205, the processor 21 determines whether or not an appropriate block operation has been performed. Specifically, on the basis of the own player character data 102, the ball data 104, and the operation data 106, the processor 21 determines whether or not an appropriate block operation has been performed by the user at an appropriate timing (see T4 in (2) of FIG. 13). When the determination in step S205 is YES, the process proceeds to step S206. When the determination is NO, the process proceeds to step S209.

In step S206, the processor 21 performs a block display. Specifically, the processor 21 performs a process of causing the own player character to block the ball 67 in the virtual space (see T4 in (2) of FIG. 13). Thereafter, the process proceeds to step S207.

In step S207, the processor 21 causes the wireless communication section 23 to transmit block data to three other game apparatuses 2 via the Internet (see T4 in (2) of FIG. 13). The block data is data determined based on the content of the block operation, and indicates the moving speed, the moving direction, etc., of the blocked ball. Thereafter, the process proceeds to step S208.

In step S208, on the basis of the block data, the processor 21 changes the moving direction of the blocked ball 67 (see T4 in (2) of FIG. 13). Thereafter, the process proceeds to step S209.

In step S209, the processor 21 determines whether or not bump data has been received from another game apparatus 2 (apparatus of a receiver) (see T6 in (2) of FIG. 12). The bump data is transmitted in step S308 in FIG. 24 described later. When the determination in step S209 is YES, the process proceeds to step S210. When the determination is NO, the processing for blocker is ended.

In step S210, the processor 21 changes the moving direction of the ball 67. Specifically, on the basis of the received bump data, the processor 21 changes, in the ally-side court, the moving direction of the ball 67 bumped by another player character (receiver) (see T6 in (2) of FIG. 12). Thereafter, the processing for blocker is ended.

[Processing for Receiver]

The game processing shown in FIG. 24 is performed when the own player character takes the role of a receiver.

In step S301, the processor 21 determines whether or not attack data has been received from another game apparatus 2 (apparatus of an attacker) (see T2 in (3) of FIG. 12). The attack data is transmitted in step S103 in FIG. 22. When the determination in step S301 is YES, the process proceeds to step S302. When the determination is NO, the process proceeds to step S304.

In step S302, the processor 21 performs an attack display, and performs hit stop. Specifically, the processor 21 causes the character of the opponent's attacker to perform an attack on the ball 67 in the virtual space, and performs hit stop to start (perform) a process of stopping the progress of time in the virtual space for a predetermined waiting time (reciprocal communication delay time) (see T2 in (3) of FIG. 12). Thereafter, the process proceeds to step S303.

In step S303, the processor 21 cancels the hit stop, and starts movement of the attack ball 67 at the first speed on the basis of the attack data (see T2-1 in (3) of FIG. 12). Thereafter, the process proceeds to step S304.

In step S304, the processor 21 determines whether or not block data has been received from another game apparatus 2 (apparatus of a blocker) (see T5 in (3) of FIG. 13). The block data is transmitted in step S207 in FIG. 23. When the determination in step S304 is YES, the process proceeds to step S305. When the determination is NO, the process proceeds to step S306.

In step S305, the processor 21 changes the moving direction of the ball 67. Specifically, on the basis of the received block data, the processor 21 changes the moving direction of the ball 67 blocked by another player character (blocker) to a direction toward the opponent-side court (see T6 in (3) of FIG. 13). Thereafter, the process proceeds to step S306.

In step S306, the processor 21 determines whether or not an appropriate bump operation has been performed. Specifically, on the basis of the own player character data 102, the ball data 104, and the operation data 106, the processor 21 determines whether or not an appropriate bump operation has been performed by the user at an appropriate timing (see T5 in (3) of FIG. 12). When the determination in step S306 is YES, the process proceeds to step S307. When the determination is NO, the processing for receiver is ended.

In step S307, the processor 21 performs a bump display. Specifically, the processor 21 performs a process of causing the own player character to bump the ball 67 in the virtual space (see T5 in (3) of FIG. 12). Thereafter, the process proceeds to step S308.

In step S308, the processor 21 causes the wireless communication section 23 to transmit bump data to three other game apparatuses 2 via the Internet (see T5 in (3) of FIG. 12). The bump data is data determined based on the content of the bump operation, and indicates the moving speed, the moving direction, etc., of the bumped ball. Thereafter, the process proceeds to step S309.

In step S309, on the basis of the bump data, the processor 21 changes the moving direction of the bumped ball 67 (see T5 in (3) of FIG. 12). Thereafter, the processing for receiver is ended.

As described above, according to the second countermeasure against communication delay, at T4 in FIG. 12, the moving speed of the ball 67 in the virtual space of the second apparatus (ally's blocker) is changed from the first speed to the second speed lower than the first speed, thereby avoiding occurrence of an unnatural display, on the game screen of the second apparatus (blocker), in which the ball 67 having landed in the ally-side court 62 moves through a space warp and thereby a bump succeeds (see (3) of FIG. 8, (3) of FIG. 9, and (2) of FIG. 3).

Moreover, as described above, according to the second countermeasure against communication delay, the timing at which movement of the ball is started is delayed by performing the hit stop in the virtual space of the third apparatus (ally's receiver) during the period of T2 to T2-1 in FIG. 13 (see (3) of FIG. 13), thereby avoiding occurrence of an unnatural display, on the game screen of the third apparatus (ally's receiver), in which the ball 67 having passed by the position of the character 63 (ally's blocker) moves through a space warp (moves instantaneously and discontinuously) and thereby a block succeeds (see (4) of FIG. 10, (4) of FIG. 11, (3) of FIG. 4).

As described above, according to the second countermeasure against communication delay, a natural display that does not cause a sense of discomfort can be achieved in the apparatuses (at least the first to third apparatuses) performing the on-line competition game (volleyball game).

[Modifications]

In the above exemplary embodiment, the volleyball game has been described as an example. However, the game processing of the exemplary embodiment is also applicable to other ball games, and games other than ball games. An example of the games other than ball games may be a game in which an object other than a ball is moved in a virtual space.

In the above exemplary embodiment, the game apparatus 2 (reception-side apparatus), which has received the attack data indicating the moving speed, the moving direction, etc., of the ball 67 from the game apparatus 2 (transmission-side apparatus) where the attack operation has been performed, performs movement control for the ball 67 hit in the virtual space of the reception-side apparatus on the basis of the attack data. However, the transmission-side apparatus may transmit, instead of the attack data, the operation data of the attack operation to the reception-side apparatus, and the reception-side apparatus may perform movement control for the ball 67 hit in the virtual space of the reception-side apparatus, on the basis of the received operation data of the attack operation. Likewise, the transmission-side apparatus may transmit, instead of the block data (or bump data), the operation data of the block operation (or the bump operation) to the reception-side apparatus, and the reception-side apparatus may perform movement control for the ball 67 blocked (or bumped) in the virtual space of the reception-side apparatus, on the basis of the received operation data.

In the above exemplary embodiment, the moving speed of the ball 67 is instantaneously changed when the ball 67 passes by the position of the blocker (the character 63 in FIG. 15) (see (2) of FIG. 12). However, the moving speed of the ball 67 may be gradually changed. For example, the moving speed may be changed smoothly or stepwise.

In the above exemplary embodiment, communication via the Internet has been described as an example. However, any communication may be adopted as long as a communication delay occurs in the communication.

In the above exemplary embodiment, various types of timings between the virtual spaces of the respective game apparatuses 2 may not necessarily be completely synchronized, and may have a certain fluctuation range (may be shifted within a moderate range).

In the above exemplary embodiment, the moving speeds of the ball 67 in the respective game apparatuses 2 may have a certain fluctuation range (may be shifted within a moderate range). For example, the first speed of the ball of the first apparatus, the first speed of the ball of the second apparatus, and the first speed of the ball of the third apparatus may be made slightly different from each other (see FIG. 12). Moreover, for example, the first to fourth apparatuses may have slightly different moving speeds (normal speeds) of the ball before an attack, or may have slightly different moving speeds (normal speeds) of the ball after a bump.

In the above exemplary embodiment, the first speed in the first countermeasure against communication delay (see FIG. 3, FIG. 4) may be different from the first speed in the second countermeasure against communication delay (see FIG. 12, FIG. 13).

In the above second countermeasure against communication delay, in the fourth virtual space of the fourth apparatus (opponent's setter) (see FIG. 12 and FIG. 13), the moving speed of the ball 67 may be the first speed. In this case, in the fourth virtual space of the fourth apparatus (opponent's setter), the ball 67 can move through a space warp as in the first countermeasure against communication delay (see (2) of FIG. 3, (3) of FIG. 4, (4) of FIG. 12, (4) of FIG. 13). However, for the fourth apparatus (opponent's setter), the next role thereof is a receiver, and a scene in which an opponent's attacker hits an attack is present therebetween. Therefore, no special countermeasure is taken in the second countermeasure against communication delay.

In the fourth virtual space of the fourth apparatus (opponent's setter) (see FIG. 12 and FIG. 13), the moving speed of the ball 67 may be changed to a speed lower than the first speed. Moreover, in the fourth virtual space of the fourth apparatus (opponent's setter) (see FIG. 12 and FIG. 13), start of movement of the ball 67 may be delayed by providing hit stop as in the case of the first apparatus and the third apparatus. This can prevent the ball 67 from moving through a space warp in the fourth virtual space.

In the above exemplary embodiment, a case where a series of processes regarding game processing is performed in a single game apparatus 2 has been described. However, in another embodiment, the series of processes above may be performed in an information processing system that includes a plurality of information processing apparatuses. For example, in an information processing system that includes a terminal side apparatus and a server side apparatus capable of communicating with the terminal side apparatus via a network, a part of the series of processes above may be performed by the server side apparatus. Alternatively, in an information processing system that includes a terminal side apparatus and a server side apparatus capable of communicating with the terminal side apparatus via a network, a main process of the series of processes above may be performed by the server side apparatus, and a part of the series of the processes may be performed by the terminal side apparatus. Still alternatively, in the information processing system, a server side system may include a plurality of information processing apparatuses, and a process to be performed in the server side system may be divided and performed by the plurality of information processing apparatuses. In addition, a so-called cloud gaming configuration may be adopted. For example, the game apparatus 2 may be configured to send operation data indicating a user's operation to a predetermined server, and the server may be configured to execute various types of game processing and stream the execution results as video/audio to the game apparatus 2.

While the exemplary embodiment has been described in detail, the foregoing description is in all aspects illustrative and not restrictive. It is to be understood that numerous other modifications and variations can be devised without departing from the scope of the exemplary embodiment.

What is claimed is:

1. An information processing system for providing an on-line competition game in which game states are synchronized between at least three information processing apparatuses, the system comprising:

a first information processing apparatus including a first processor and a memory connected thereto, the first processor providing a first virtual space;

a second information processing apparatus including a second processor and a memory connected thereto, the second processor providing a second virtual space; and a third information processing apparatus including a third processor and a memory connected thereto, the third processor providing a third virtual space, the first virtual space, the second virtual space, and the third virtual space corresponding to each other, wherein the first processor performs a first game event regarding a moving object in the first virtual space, transmits first data regarding execution of the first game event to the second information processing apparatus and the third information processing apparatus, and controls movement of the moving object such that the moving object moves in the first virtual space, on the basis of the first game event, the second processor controls movement of the moving object such that the moving object moves in the second virtual space, on the basis of the first data received from the first information processing apparatus, the third processor controls movement of the moving object such that the moving object moves in the third virtual space, on the basis of the first data received from the first information processing apparatus, the second processor performs a second game event for changing a moving direction of the moving object when a first condition regarding the moving object, which is moving in the second virtual space on the basis of the first data, has been satisfied, and when the second game event is performed, transmits second data regarding the second game event to the first information processing apparatus and the third information processing apparatus, when the first condition has been satisfied, the first processor controls movement of the moving object in the first virtual space, on the basis of the second data received from the second information processing apparatus, the third processor when the first condition has been satisfied, controls movement of the moving object in the third virtual space on the basis of the second data obtained from the second information processing apparatus, and performs a third game event for changing the moving direction of the moving object, when the second game event has not been performed and a second condition regarding the moving object, which is moving in the third virtual space on the basis of the first data, has been satisfied, the first processor controls movement of the moving object such that the moving object moves at a first speed during a period after the first game event, the second processor controls movement of the moving object such that the moving object moves at the first speed during a first period after reception of the first data, the third processor controls movement of the moving object such that the moving object moves at the first speed during a period after reception of the first data, and based on a determination that the second game event has not been performed, the second processor controls movement of the moving object to decrease a speed of the moving object to a second speed lower than the first speed during a second period after the first period, wherein a moving speed of the moving object on the first and third apparatuses is maintained at the first speed when the second game event has not been performed.

2. The information processing system according to claim 1, wherein the second period is a period after the moving object has passed by a predetermined position in the second virtual space.

3. The information processing system according to claim 1, wherein the first processor controls movement of the moving object when a first waiting time has passed after the first game event.

4. The information processing system according to claim 3, wherein the third processor controls movement of the moving object when a second waiting time has passed after reception of the first data.

5. The information processing system according to claim 4, wherein the second waiting time is shorter than the first waiting time.

6. The information processing system according to claim 4, wherein the second waiting time is a time regarding data transmission from the first apparatus to the third apparatus, or a time obtained by doubling the time regarding data transmission from the third apparatus to the first apparatus.

7. The information processing system according to claim 3, wherein the first waiting time is a time obtained by doubling a time regarding data transmission/reception between the first apparatus and the third apparatus.

8. The information processing system according to claim 1, wherein the first processor, the second processor, and the third processor each move the moving object at a normal speed during a normal period before the first game event.

9. The information processing system according to claim 8, wherein the normal speed is equal to the first speed.

10. The information processing system according to claim 1, wherein in the on-line competition game, an opponent character linked with the first information processing apparatus is disposed in each of first areas in the first virtual space, the second virtual space, and the third virtual space, a first ally character linked with the second information processing apparatus and a second ally character linked with the third information processing apparatus are disposed in each of second areas in the first virtual space, the second virtual space, and the third virtual space, the first game event includes at least a control in which the opponent character moves the moving object from the first area to the second area, the second game event includes at least a control in which the first ally character, based on the second data, causes the moving object being moved according to the first game event to move toward the first area, and the third game event includes at least a control in which the moving object being moved according to the first game event is moved toward the first ally character.

11. The information processing system according to claim 1, wherein in accordance with a progress of the on-line competition game, each of the first game event, the second game event, and the third game event is performed while changing an apparatus that performs the event among at least the first information processing apparatus, the second information processing apparatus, and the third information processing apparatus.

12. A non-transitory computer-readable storage medium which is used in an information processing system for providing an on-line competition game in which game states are synchronized between at least a first information processing apparatus providing a first virtual space that includes a moving object, a second information processing apparatus providing a second virtual space that includes the moving object and corresponds to the first virtual space, and a third information processing apparatus providing a third virtual space that includes the moving object and corresponds to the first virtual space and the second virtual space, the storage medium having stored therein instructions that, when executed by a processor of the second information processing apparatus which is a component of the information processing system, cause the second information processing apparatus to perform operations comprising:

controlling movement of the moving object such that the moving object moves in the second virtual space, on the basis of predetermined data received from the first information processing apparatus and regarding execution of a first game event, performing a second game event for changing a moving direction of the moving object, when a predetermined condition regarding the moving object that is moving in the second virtual space has been satisfied, controlling movement of the moving object such that the moving object moves, in the second virtual space, at a first speed that is a moving speed of the moving object in the third virtual space, during a first period after reception of the predetermined data, and based on a determination that the second game event has not been performed, controlling movement of the moving object to decrease a speed, in the second virtual space, of the moving object to a second speed lower than the first speed during a second period after the first period;

wherein a moving speed of the moving object on the first and third apparatuses is maintained at the first speed when the second game event has not been performed.

13. A non-transitory computer-readable storage medium which is used in an information processing system for providing an on-line competition game in which game states are synchronized between at least a first information processing apparatus providing a first virtual space that includes a moving object, a second information processing apparatus providing a second virtual space that includes the moving object and corresponds to the first virtual space, and a third information processing apparatus providing a third virtual space that includes the moving object and corresponds to the first virtual space and the second virtual space, the storage medium having stored therein instructions that, when executed by a processor of the third information processing apparatus which is a component of the information processing system, cause the third information processing apparatus to perform operations comprising:

controlling movement of the moving object such that the moving object moves in the third virtual space, on the basis of first data received from the first information processing apparatus and regarding execution of a first game event, controlling movement of the moving object in the third virtual space, on the basis of second data received from the second information processing apparatus and regarding a second game event in a case where the second game event is performed, controlling movement of the moving object such that the moving object moves, in the third virtual space, at a predetermined speed that is a moving speed of the moving object in the second virtual space, during a period after reception of the first data, and based on reception of the first data, controlling movement of the moving object such that movement of the moving object is paused during a waiting time after reception of the first data, wherein movement of the moving object is not paused during the waiting time on at least one of the first and second information processing apparatus when the first data is received.

14. An information processing apparatus being a second information processing apparatus including a processor and a memory connected thereto, the second information processing apparatus being a component of an information processing system for providing an on-line competition game in which game states are synchronized between at least a first information processing apparatus providing a first virtual space that includes a moving object, the second information processing apparatus providing a second virtual space that includes the moving object and corresponds to the first virtual space, and a third information processing apparatus providing a third virtual space that includes the moving object and corresponds to the first virtual space and the second virtual space, the processor being configured to control the second information processing apparatus to at least:

control movement of the moving object such that the moving object moves in the second virtual space, on the basis of predetermined data received from the first information processing apparatus and regarding execution of a first game event, perform a second game event for changing a moving direction of the moving object, when a predetermined condition regarding the moving object that is moving in the second virtual space has been satisfied, control movement of the moving object such that the moving object moves, in the second virtual space, at a first speed that is a moving speed of the moving object in the third virtual space, during a first period after reception of the predetermined data, and based on a determination that the second game event has not been performed, control movement of the moving object to decrease a speed, in the second virtual space, of the moving object to a second speed lower than the first speed during a second period after the first period, wherein a moving speed of the moving object on the first and third apparatuses is maintained at the first speed when the second game event has not been performed.

15. An information processing apparatus being a third information processing apparatus including a processor and a memory connected thereto, the third information processing apparatus being a component of an information processing system for providing an on-line competition game in which game states are synchronized between at least a first information processing apparatus providing a first virtual space that includes a moving object, a second information processing apparatus providing a second virtual space that includes the moving object and corresponds to the first virtual space, and the third information processing apparatus providing a third virtual space that includes the moving object and corresponds to the first virtual space and the second virtual space, the processor being configured to control the third information processing apparatus to at least:

control movement of the moving object such that the moving object moves in the third virtual space, on the basis of first data received from the first information processing apparatus and regarding execution of a first game event, control movement of the moving object in the third virtual space, on the basis of second data received from the second information processing apparatus and regarding a second game event in a case where the second game event is performed, control movement of the moving object such that the moving object moves, in the third virtual space, at a predetermined speed that is a moving speed of the moving object in the second virtual space, during a period after reception of the first data, and based on reception of the first data, control movement of the moving object such movement of the moving object is paused during a waiting time after reception of the first data, wherein movement of the moving object is not paused during the waiting time on at least one of the first and second information processing apparatus when the first data is received.

16. An information processing method for providing an on-line competition game which is performed by at least three processors configured to control an information processing system and in which game states are synchronized between at least three information processing apparatuses, the at least three information processing apparatuses including a first information processing apparatus including a first processor that provides a first virtual space, a second information processing apparatus including a second processor that provides a second virtual space, and a third information processing apparatus including a third processor that provides a third virtual space, the first virtual space, the second virtual space, and the third virtual space corresponding to each other, the information processing method comprising:

at the first processor:

performing a first game event regarding a moving object in the first virtual space, transmitting first data regarding execution of the first game event to the second information processing apparatus and the third information processing apparatus, and controlling movement of the moving object such that the moving object moves in the first virtual space, on the basis of the first game event;

at the second processor:

controlling movement of the moving object such that the moving object moves in the second virtual space, on the basis of the first data received from the first information processing apparatus;

at the third processor:

controlling movement of the moving object such that the moving object moves in the third virtual space, on the basis of the first data received from the first information processing apparatus;

at the second processor:

performing a second game event for changing a moving direction of the moving object when a first condition regarding the moving object, which is moving in the second virtual space on the basis of the first data, has been satisfied, and based on performance of the second game event, transmitting second data regarding the second game event to the first information processing apparatus and the third information processing apparatus;

at the first processor:

controlling movement of the moving object in the first virtual space, on the basis of the second data received from the second information processing apparatus, when the first condition has been satisfied;

at the third processor:

based on satisfaction of the first condition, controlling movement of the moving object in the third virtual space on the basis of the second data obtained from the second information processing apparatus, and performing a third game event for changing the moving direction of the moving object, when the second game event has not been performed and a second condition regarding the moving object, which is moving in the third virtual space on the basis of the first data, has been satisfied;

at the first processor, controlling movement of the moving object such that the moving object moves at a first speed during a period after the first game event;

at the second processor, controlling movement of the moving object such that the moving object moves at the first speed during a first period after reception of the first data;

at the third processor, controlling movement of the moving object such that the moving object moves at the first speed during a period after reception of the first data; and at the second processor, based on a determination that the second game event has not been performed, controlling movement of the moving object to decrease a speed of the moving object to a second speed lower than the first speed during a second period after the first period, wherein a moving speed of the moving object on the first and third apparatuses is maintained at the first speed when the second game event has not been performed.

17. The information processing method according to claim 16, wherein the second period is a period after the moving object has passed by a predetermined position in the second virtual space.

18. The information processing method according to claim 16, wherein the first processor controls movement of the moving object when a first waiting time has passed after the first game event.

19. The information processing method according to claim 18, wherein the third processor controls movement of the moving object when a second waiting time has passed after reception of the first data.

20. The information processing method according to claim 19, wherein the second waiting time is shorter than the first waiting time.

* * * * *